US011647499B2

(12) United States Patent
Huang et al.

(10) Patent No.: US 11,647,499 B2
(45) Date of Patent: May 9, 2023

(54) FRAME STRUCTURE FOR SUBBAND FULL DUPLEX SLOT FORMATS

(71) Applicant: QUALCOMM Incorporated, San Diego, CA (US)

(72) Inventors: Yi Huang, San Diego, CA (US); Muhammad Sayed Khairy Abdelghaffar, San Jose, CA (US); Ahmed Attia Abotabl, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 17/315,744

(22) Filed: May 10, 2021

(65) Prior Publication Data

US 2021/0360670 A1 Nov. 18, 2021

Related U.S. Application Data

(60) Provisional application No. 63/024,333, filed on May 13, 2020.

(51) Int. Cl.
*H04W 72/12* (2009.01)
*H04L 5/14* (2006.01)
*H04W 72/1273* (2023.01)
*H04W 8/24* (2009.01)
*H04W 72/0446* (2023.01)
*H04W 72/0453* (2023.01)

(52) U.S. Cl.
CPC .......... *H04W 72/1273* (2013.01); *H04L 5/14* (2013.01); *H04W 8/24* (2013.01); *H04W 72/0446* (2013.01); *H04W 72/0453* (2013.01); *H04W 72/1257* (2013.01)

(58) Field of Classification Search
CPC ............ H04W 72/1289; H04W 72/04; H04W 72/0406; H04W 72/0446; H04W 72/1278; H04L 5/0058; H04L 5/0066; H04L 5/0078; H04L 5/0083; H04L 27/2602
See application file for complete search history.

(56) References Cited

U.S. PATENT DOCUMENTS

2017/0019886 A1* 1/2017 Patel ...................... H04W 4/70
2017/0290008 A1* 10/2017 Tooher ............. H04W 72/0446
(Continued)

FOREIGN PATENT DOCUMENTS

WO  WO-2017078786 A1 * 5/2017 ........... H04L 5/0053
WO  WO-2017171398 A1 * 10/2017 ......... H04L 27/2607

*Primary Examiner* — Romani Ohri
(74) *Attorney, Agent, or Firm* — Holland & Hart LLP

(57) ABSTRACT

Methods, systems, and devices for wireless communications are described. A base station of a wireless communications system may transmit, to a user equipment (UE), a configuration message that indicates a transmission time interval (TTI) format for a plurality of TTIs. At least one format for the plurality of TTIs includes uplink resources and downlink resources separated in the frequency domain, which may be an example of a subband full duplex (SBFD) slot. Since the pattern may include some transitions between uplink and downlink resources, one or more gap periods (e.g., time gaps) may be positioned between such resources.

30 Claims, 15 Drawing Sheets

(56) References Cited

U.S. PATENT DOCUMENTS

| | | | |
|---|---|---|---|
| 2017/0332397 A1* | 11/2017 | Li | H04W 72/0446 |
| 2018/0310324 A1* | 10/2018 | Ibars Casas | H04W 72/121 |
| 2019/0045394 A1* | 2/2019 | Takano | H04W 72/04 |
| 2019/0068423 A1* | 2/2019 | Hwang | H04L 5/0041 |

* cited by examiner

FRAME STRUCTURE FOR SUBBAND FULL DUPLEX SLOT FORMATS

CROSS REFERENCE

The present application for patent claims the benefit of U.S. Provisional Patent Application No. 63/024,333 by HUANG et al., entitled "FRAME STRUCTURE FOR SUBBAND FULL DUPLEX SLOT FORMATS," filed May 13, 2020, assigned to the assignee hereof, and expressly incorporated by reference herein.

FIELD OF TECHNOLOGY

The following relates generally to wireless communications and more specifically to frame structure for subband full duplex slot formats.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless radio access technologies (RATs) may support communication via various modes. For example, a base station may configure communications in a slot for one of uplink or downlink communications, which may be referred to a half-duplex mode. However, a device may be able to perform both uplink and downlink communications within the same slot. Performing uplink and downlink communications within the same slot may be referred to as full duplex. As such, resources may be allocated for UE by the base station depending on the capability of the UE to perform half or full duplex communications as well as in order to avoid interference between multiple transmissions.

SUMMARY

The described techniques relate to improved methods, systems, devices, and apparatuses that support frame structure for subband full duplex slot formats. Generally, the described techniques provide for a base station of a wireless communications system transmitting, to a user equipment (UE), a configuration message that indicates a transmission time interval (TTI) format for a plurality of TTIs. At least one format for the plurality of TTIs includes uplink resources and downlink resources separated in the frequency domain, which may be an example of a subband full duplex (SBFD) slot. Since the pattern may include some transitions between uplink and downlink resources, one or more gap periods (e.g., time gaps) may be positioned between such resources. These time gaps may support the procedures to change transmission direction (e.g., radio frequency (RF) tuning) in both a UE and a base station as well as to account for inter-base station interference due to large propagation delay (e.g., various distances between multiple base stations and a UE).

A method of wireless communications at a UE is described. The method may include receiving, from a base station, a configuration message indicating a TTI format for each TTI of a set of TTIs that includes a first TTI having a TTI format specifying an uplink resource and a downlink resource separated in a frequency domain, identifying a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, scheduling communications with the base station in the first TTI and the second TTI based on the TTI format of the first TTI and the time gap, and communicating with the base station during the first TTI and the second TTI in accordance with the scheduling.

An apparatus for wireless communications at a UE is described. The apparatus may include a processor, memory coupled with the processor, and instructions stored in the memory. The instructions may be executable by the processor to cause the apparatus to receive, from a base station, a configuration message indicating a TTI format for each TTI of a set of TTIs that includes a first TTI having a TTI format specifying an uplink resource and a downlink resource separated in a frequency domain, identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, schedule communications with the base station in the first TTI and the second TTI based on the TTI format of the first TTI and the time gap, and communicate with the base station during the first TTI and the second TTI in accordance with the scheduling.

Another apparatus for wireless communications at a UE is described. The apparatus may include means for receiving, from a base station, a configuration message indicating a TTI format for each TTI of a set of TTIs that includes a first TTI having a TTI format specifying an uplink resource and a downlink resource separated in a frequency domain, identifying a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, scheduling communications with the base station in the first TTI and the second TTI based on the TTI format of the first TTI and the time gap, and communicating with the base station during the first TTI and the second TTI in accordance with the scheduling.

A non-transitory computer-readable medium storing code for wireless communications at a UE is described. The code may include instructions executable by a processor to receive, from a base station, a configuration message indicating a TTI format for each TTI of a set of TTIs that includes a first TTI having a TTI format specifying an uplink resource and a downlink resource separated in a frequency domain, identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, schedule communications with the base station in the first TTI and the second TTI based on the TTI format of the first TTI and the time gap, and communicate with the base station during the first TTI and the second TTI in accordance with the scheduling.

In some examples of the method, apparatuses, and non-transitory computer-readable medium described herein, identifying the time gap may include operations, features, means, or instructions for identifying the time gap based on the TTI format of the first TTI and the TTI format of the second TTI.

In some examples of the method, apparatuses, and non-transitory computer-readable medium described herein, scheduling the communications may include operations, features, means, or instructions for receiving, from the base station, a scheduling message that schedules the communications for the first TTI and the second TTI, where the time gap may be identified based on the scheduling message.

In some examples of the method, apparatuses, and non-transitory computer-readable medium described herein, receiving the configuration message may include operations, features, means, or instructions for receiving the configuration message that indicates a time gap configuration, where the time gap may be identified based on the time gap configuration.

In some examples of the method, apparatuses, and non-transitory computer-readable medium described herein, receiving the configuration message may include operations, features, means, or instructions for receiving the configuration message that indicates the set of TTIs includes one or more uplink TTIs and one or more downlink TTIs, where the time gap may be identified based on the configuration message.

In some examples of the method, apparatuses, and non-transitory computer-readable medium described herein, receiving the configuration message may include operations, features, means, or instructions for receiving the configuration message that indicates the set of TTIs includes one or more uplink TTIs, one or more downlink TTIs, and one or more TTIs including an uplink resource and a downlink resource separated in a time domain, where the time gap may be identified based on the configuration message.

In some examples of the method, apparatuses, and non-transitory computer-readable medium described herein, scheduling the communications may include operations, features, means, or instructions for receiving, from the base station, a scheduling message that schedules the communications in the uplink resource or the downlink resource of the first TTI and the resource of the second TTI, where the time gap may be identified based on the uplink resource or the downlink resource of the first TTI at least partially overlapping in the frequency domain with the resource of the second TTI.

In some examples of the method, apparatuses, and non-transitory computer-readable medium described herein, identifying the time gap may include operations, features, means, or instructions for identifying that the time gap may be located in a time domain resource of the first TTI and at least partially overlaps with the uplink resource or the downlink resource of the first TTI and the resource of the second TTI in the frequency domain.

In some examples of the method, apparatuses, and non-transitory computer-readable medium described herein, identifying the time gap may include operations, features, means, or instructions for identifying that the time gap may be located in a time domain resource of the second TTI and at least partially overlaps with the uplink resource or the downlink resource of the first TTI and the resource of the second TTI in the frequency domain.

Some examples of the method, apparatuses, and non-transitory computer-readable medium described herein may further include operations, features, means, or instructions for identifying that the resource of the second TTI may be a downlink resource, where the time gap may be identified between the downlink resource of the second TTI and the uplink resource of the first TTI.

In some examples of the method, apparatuses, and non-transitory computer-readable medium described herein, receiving the configuration message may include operations, features, means, or instructions for receiving the configuration message that indicates the second TTI may be a downlink TTI.

In some examples of the method, apparatuses, and non-transitory computer-readable medium described herein, receiving the configuration message may include operations, features, means, or instructions for receiving the configuration message that indicates a time gap configuration for the time gap, where the time gap may be identified based on the time gap configuration.

In some examples of the method, apparatuses, and non-transitory computer-readable medium described herein, the first TTI follows the second TTI.

In some examples of the method, apparatuses, and non-transitory computer-readable medium described herein, the second TTI follows the first TTI and the time gap includes a timing advance value.

Some examples of the method, apparatuses, and non-transitory computer-readable medium described herein may further include operations, features, means, or instructions for identifying that the resource of the second TTI may be an uplink resource, where the time gap may be identified between the uplink resource of the second TTI and the downlink resource of the first TTI.

In some examples of the method, apparatuses, and non-transitory computer-readable medium described herein, receiving the configuration message may include operations, features, means, or instructions for receiving the configuration message that indicates the second TTI may be an uplink TTI or a TTI including the uplink resource and a downlink resource separated in a time domain.

In some examples of the method, apparatuses, and non-transitory computer-readable medium described herein, receiving the configuration message may include operations, features, means, or instructions for receiving the configuration message that indicates a time gap configuration for the time gap, where the time gap may be identified based on the time gap configuration.

In some examples of the method, apparatuses, and non-transitory computer-readable medium described herein, the second TTI follows the first TTI.

In some examples of the method, apparatuses, and non-transitory computer-readable medium described herein, the first TTI follows the second TTI and the time gap includes a timing advance value.

Some examples of the method, apparatuses, and non-transitory computer-readable medium described herein may further include operations, features, means, or instructions for transmitting, to the base station, an indication of a UE capability of the UE, where the time gap may be identified based on the indication of the UE capability.

In some examples of the method, apparatuses, and non-transitory computer-readable medium described herein, receiving the configuration message may include operations, features, means, or instructions for receiving the configuration message that indicates a time gap configuration for the time gap based on the UE capability.

A method of wireless communications at a base station is described. The method may include transmitting, to a UE, a configuration message indicating a TTI format for each TTI of a set of TTIs that includes a first TTI having a TTI format an uplink resource and a downlink resource separated in a frequency domain, identifying a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, scheduling communications with the UE in the first TTI and the second TTI based on the TTI format of the first TTI, and the time gap, and communicating with the UE during the first TTI and the second TTI in accordance with the scheduling.

An apparatus for wireless communications at a base station is described. The apparatus may include a processor, memory coupled with the processor, and instructions stored in the memory. The instructions may be executable by the processor to cause the apparatus to transmit, to a UE, a configuration message indicating a TTI format for each TTI of a set of TTIs that includes a first TTI having a TTI format an uplink resource and a downlink resource separated in a frequency domain, identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, schedule communications with the UE in the first TTI and the second TTI based on the TTI format of the first TTI, and the time gap, and communicate with the UE during the first TTI and the second TTI in accordance with the scheduling.

Another apparatus for wireless communications at a base station is described. The apparatus may include means for transmitting, to a UE, a configuration message indicating a TTI format for each TTI of a set of TTIs that includes a first TTI having a TTI format an uplink resource and a downlink resource separated in a frequency domain, identifying a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, scheduling communications with the UE in the first TTI and the second TTI based on the TTI format of the first TTI, and the time gap, and communicating with the UE during the first TTI and the second TTI in accordance with the scheduling.

A non-transitory computer-readable medium storing code for wireless communications at a base station is described. The code may include instructions executable by a processor to transmit, to a UE, a configuration message indicating a TTI format for each TTI of a set of TTIs that includes a first TTI having a TTI format an uplink resource and a downlink resource separated in a frequency domain, identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, schedule communications with the UE in the first TTI and the second TTI based on the TTI format of the first TTI, and the time gap, and communicate with the UE during the first TTI and the second TTI in accordance with the scheduling.

In some examples of the method, apparatuses, and non-transitory computer-readable medium described herein, identifying the time gap may include operations, features, means, or instructions for identifying the time gap based on the TTI format of the first TTI and the TTI format of the second TTI.

In some examples of the method, apparatuses, and non-transitory computer-readable medium described herein, scheduling the communications may include operations, features, means, or instructions for transmitting, to the UE, a scheduling message that schedules the communications for the first TTI and the second TTI, where the time gap may be identified based on the scheduling message.

In some examples of the method, apparatuses, and non-transitory computer-readable medium described herein, identifying the time gap may include operations, features, means, or instructions for identifying the time gap based on a time gap configuration indicated in the configuration message.

In some examples of the method, apparatuses, and non-transitory computer-readable medium described herein, transmitting the configuration message may include operations, features, means, or instructions for transmitting the configuration message that indicates that the set of TTIs includes one or more uplink TTIs and one or more downlink TTIs.

In some examples of the method, apparatuses, and non-transitory computer-readable medium described herein, transmitting the configuration message may include operations, features, means, or instructions for transmitting the configuration message that indicates that the set of TTIs includes one or more uplink TTIs, one or more downlink TTIs, and one or more TTIs including an uplink resource and a downlink resource separated in a time domain.

In some examples of the method, apparatuses, and non-transitory computer-readable medium described herein, scheduling the communications may include operations, features, means, or instructions for transmitting, to the UE, a scheduling message that schedules the communications in the uplink resource or the downlink resource of the first TTI and the resource of the second TTI, where the time gap may be identified based on the uplink resource or the downlink resource of the first TTI at least partially overlapping in the frequency domain with the resource of the second TTI.

In some examples of the method, apparatuses, and non-transitory computer-readable medium described herein, identifying the time gap may include operations, features, means, or instructions for identifying that the time gap may be located in a time domain resource of the first TTI and at least partially overlaps with the uplink resource or the downlink resource of the first TTI and the resource of the second TTI in the frequency domain.

In some examples of the method, apparatuses, and non-transitory computer-readable medium described herein, identifying the time gap may include operations, features, means, or instructions for identifying that the time gap may be located in a time domain resource of the second TTI and at least partially overlaps with the uplink resource or the downlink resource of the first TTI and the resource of the second TTI in the frequency domain.

Some examples of the method, apparatuses, and non-transitory computer-readable medium described herein may further include operations, features, means, or instructions for identifying that the resource of the second TTI may be a downlink resource, where the time gap may be identified between the downlink resource of the second TTI and the uplink resource of the first TTI.

In some examples of the method, apparatuses, and non-transitory computer-readable medium described herein, transmitting the configuration message may include operations, features, means, or instructions for transmitting the configuration message that indicates the second TTI may be a downlink TTI.

In some examples of the method, apparatuses, and non-transitory computer-readable medium described herein, transmitting the configuration message may include operations, features, means, or instructions for transmitting the configuration message that indicates a time gap configuration for the time gap, where the time gap may be identified based on the time gap configuration.

In some examples of the method, apparatuses, and non-transitory computer-readable medium described herein, the first TTI follows the second TTI.

In some examples of the method, apparatuses, and non-transitory computer-readable medium described herein, the second TTI follows the first TTI and the time gap includes a timing advance value.

Some examples of the method, apparatuses, and non-transitory computer-readable medium described herein may further include operations, features, means, or instructions for identifying that the resource of the second TTI may be an uplink resource, where the time gap may be identified between the uplink resource of the second TTI and the downlink resource of the first TTI.

In some examples of the method, apparatuses, and non-transitory computer-readable medium described herein, transmitting the configuration message may include operations, features, means, or instructions for transmitting the configuration message that indicates the second TTI may be an uplink TTI or a TTI including the uplink resource and a downlink resource separated in a time domain.

In some examples of the method, apparatuses, and non-transitory computer-readable medium described herein, transmitting the configuration message may include operations, features, means, or instructions for transmitting the configuration message that indicates a time gap configuration for the time gap, where the time gap may be identified based on the time gap configuration.

In some examples of the method, apparatuses, and non-transitory computer-readable medium described herein, the second TTI follows the first TTI.

In some examples of the method, apparatuses, and non-transitory computer-readable medium described herein, the first TTI follows the second TTI and the time gap includes a timing advance value.

Some examples of the method, apparatuses, and non-transitory computer-readable medium described herein may further include operations, features, means, or instructions for receiving, from the UE, an indication of a UE capability of the UE, where the time gap may be identified based on the indication of the UE capability.

Some examples of the method, apparatuses, and non-transitory computer-readable medium described herein may further include operations, features, means, or instructions for determining a time gap configuration for the time gap based on the UE capability, where the configuration message indicates the time gap configuration for the time gap.

DETAILED DESCRIPTION

Figure 1:
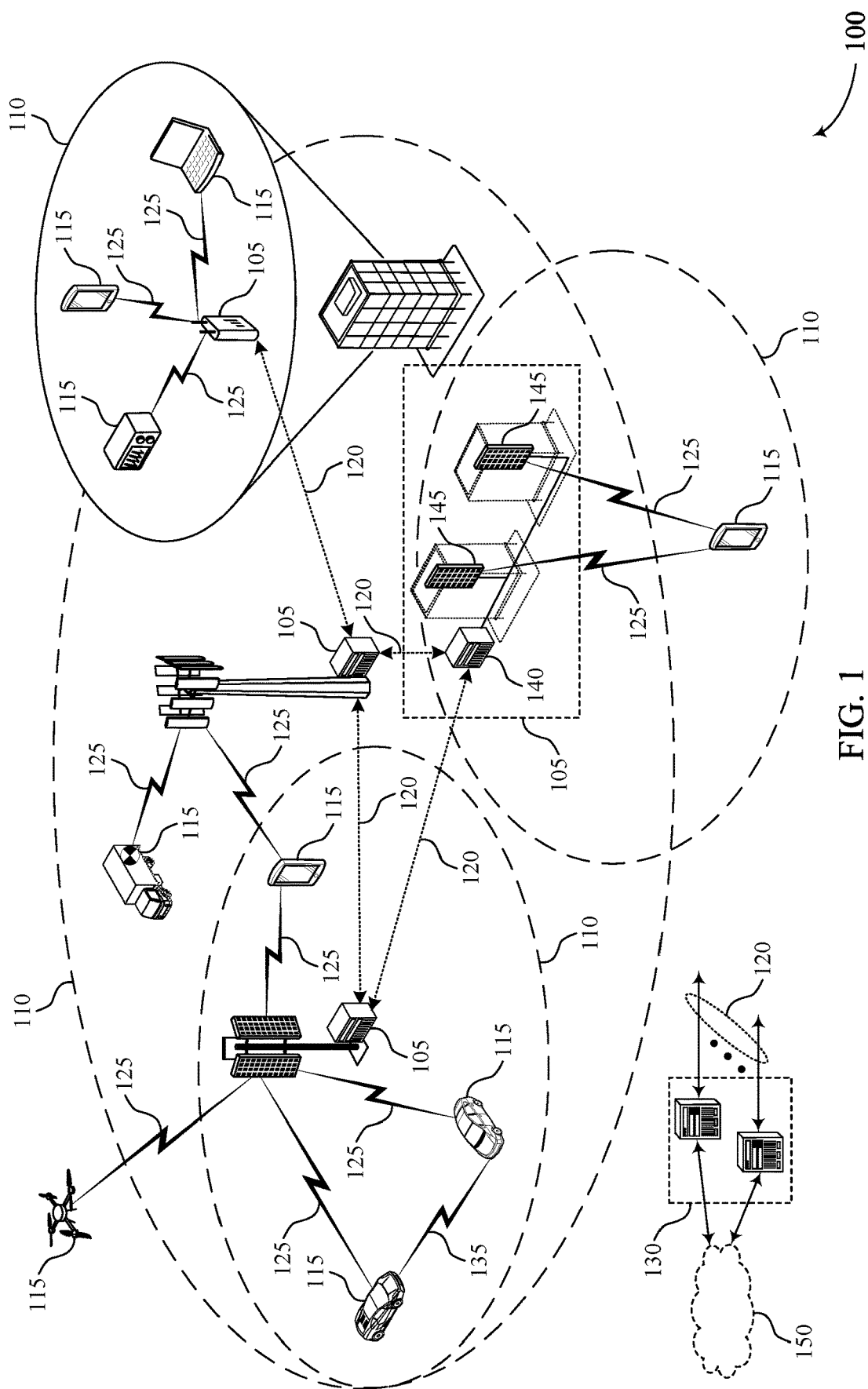
FIG. 1 illustrates an example of a system for wireless communications that supports a frame structure for subband full duplex slot formats in accordance with aspects of the present disclosure.

A wireless communications system may support communications in designated duration periods, which may be referred to as transmission time intervals (TTIs), slots, or the like. Some wireless communications systems may designate a TTI for uplink or downlink communications. When devices are operating in a particular bandwidth, the uplink communications or downlink communications may not utilize the entire bandwidth. For example, a UE performing an uplink transmission during an uplink TTI may use a portion of the bandwidth during the TTI. Thus, the network may be power limited, in that the bandwidths may not be utilized efficiently.

Some wireless radio access technologies (RATs) may support operation in accordance with a full duplex mode. A full duplex mode allows devices to perform both uplink and downlink communication in the same transmission time interval (e.g., in a same slot). A full duplex mode may be in-band full duplex, in which devices may transmit and receive on the same or overlapping time and frequency resources, or subband full duplex (also referred to as flexible duplex), in which devices may transmit and receive at the same (or overlapping) time resources but in different frequency resources. More particularly, in a subband full duplex mode, the downlink resources may be separated from the uplink resources in a frequency domain. A set of contiguous TTIs may be configured with multiple slot configurations. For example, a set of four slots may include two half-duplex slots, including one uplink slot and one downlink slot, and two full duplex slots. These slot formats may be repeated for subsequent sets of four slots.

A base station of a wireless communications system may transmit, to a UE, a configuration message that indicates a TTI format for a plurality of TTIs. In some cases, the TTI format for each of the TTIs may be repeated for a subsequent plurality of TTIs. That is, the pattern of TTIs may be repeated for an extended period. Since the pattern may include some transitions between uplink and downlink resources, one or more gap periods (e.g., time gaps) may be positioned between such resources. These time gaps may support the procedures to change transmission direction (e.g., radio frequency (RF) tuning) in both a UE and a base station as well as account for inter-base station interference due to large propagation delay (e.g., various distances between multiple base stations and a UE). The time gaps may be identified based on the TTI formats for the plurality of TTIs, the scheduling of communications, or the like. In some cases, the UE may identify the time gap based on the TTI formats of two adjacent TTIs. Thus, the UE may be configured with the time gap configuration based on a first TTI being an uplink or downlink TTI and a second TTI being a subband full duplex (SBFD) TTI with an SBFD resource configuration.

The time gap between a downlink resource or an uplink resource of an SBFD TTI and an adjacent TTI with a resource in an opposing direction may be positioned in the time domain resources of the SBFD TTI or the time domain resources of the adjacent TTI. In some cases, a time gap may not be configured between uplink or downlink resources of the SBFD TTI and an adjacent TTI with the resource in the same direction. That is, a time gap may not be necessary between an uplink TTI and the uplink resources of the SBFD TTI or between a downlink TTI and the downlink resources of the SBFD TTI. In some examples, a transition between uplink resources of an SBFD and downlink resources of a subsequent TTI, such as a downlink TTI, may be handled by a timing advance value. Thus, any time gap for such a transition may be identified based on the timing advance value. The timing advance value may similarly define a time gap between uplink resources of a first TTI and the downlink resources of the subsequent SBFD TTI.

Particular aspects of the subject matter described herein may be implemented to realize one or more advantages. The described techniques may support improvements in the semi-persistent scheduling (SPS) and SBFD framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to a wireless communications system, TTI patterns, and a process flow diagram. Aspects of the disclosure are further illustrated by and described with reference to apparatus diagrams, system diagrams, and flowcharts that relate to frame structure for subband full duplex slot formats.

FIG. 1 illustrates an example of a wireless communications system 100 that supports a frame structure for subband full duplex slot formats in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. A TTI may be, for example, symbol period, two or more symbol periods, a mini-slot, a slot, a subframe, a frame, or other time duration. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support various communications modes such as half and full duplex modes. When devices are operating in a particular bandwidth in accordance with a half duplex mode, the uplink communications or downlink communications may not utilize the entire bandwidth. For example, a UE 115 performing an uplink transmission during an uplink TTI may use a portion of the bandwidth during the TTI. Thus, the network may be power limited, in that the bandwidth may not be fully utilized by a single UE. In a subband FDD (SBFD) (also referred to as flexible duplex), the UE 115 and the base station 105 may transmit and receive at the same time while using different frequency resources. In an SBFD TTI, the downlink resources may be separated from the uplink resource in a frequency domain. That is, the frequency domain of a component carrier bandwidth may be partitioned into one or more uplink bandwidths and one or more downlink bandwidths. Thus, an SBFD TTI may more efficiently utilize frequency resources since the UE 115 and the base station 105 may perform uplink and downlink communications within the same TTI.

Further, the full duplex mode may improve cell edge coverage with minimal loss in throughput relative to a baseline time division multiplexed (e.g., half duplex) mode. The SBFD mode may be applied across component carriers or within component carries in the case of carrier aggregation in unpaired spectrum. The SBFD mode may also reduce latency by supporting increased uplink transmission resources. In some cases, the SBFD mode may enable an "always-on" uplink resources. That is, at least one uplink resource may be available in a set of contiguous TTIs, while also supporting downlink communications. Thus, the uplink communications may be accorded higher uplink throughput.

Various systems may allocate NR frequency bands that are paired (e.g., various uplink bands are paired with various downlink bands), or unpaired spectrum, in which the TTIs may be configured for uplink and/or downlink communications. In some examples, the bands of the unpaired spectrum may be configured for SBFD slots, such that the slot includes both uplink and downlink resources (and guard resources). That is, SBFD mode may be performed in the unpaired spectrum. However, it should be understood that the techniques described herein are not limited to unpaired spectrum and that the techniques may be performed in various frequency bands.

In accordance with the techniques described herein, a UE 115 and a base station 105 may be configured to identify one or more time gaps between opposing resources of adjacent TTIs, where one of the adjacent TTIs is a SBFD TTI. The time gaps may support transmission direction transition procedures in a base station 105 and a UE 115. For example, the UE 115 may require some time to transition from downlink communications to uplink communications (e.g., to account for RF tuning and the like). The time gaps may be identified based on the TTI formats of the TTIs, a configuration message, a scheduling message, etc. In some examples, the time gaps are positioned in time domain resources of the SBFD TTI. In the same or other examples, the time gaps are positioned in the time domain resources of the adjacent TTI. The size or duration of the time gap may depend on the cell size. For example, a larger cell size may result in a larger (or longer duration) time gap being identified relative to a smaller cell. These and other implementations are described further with respect to the following figures.

Figure 2:
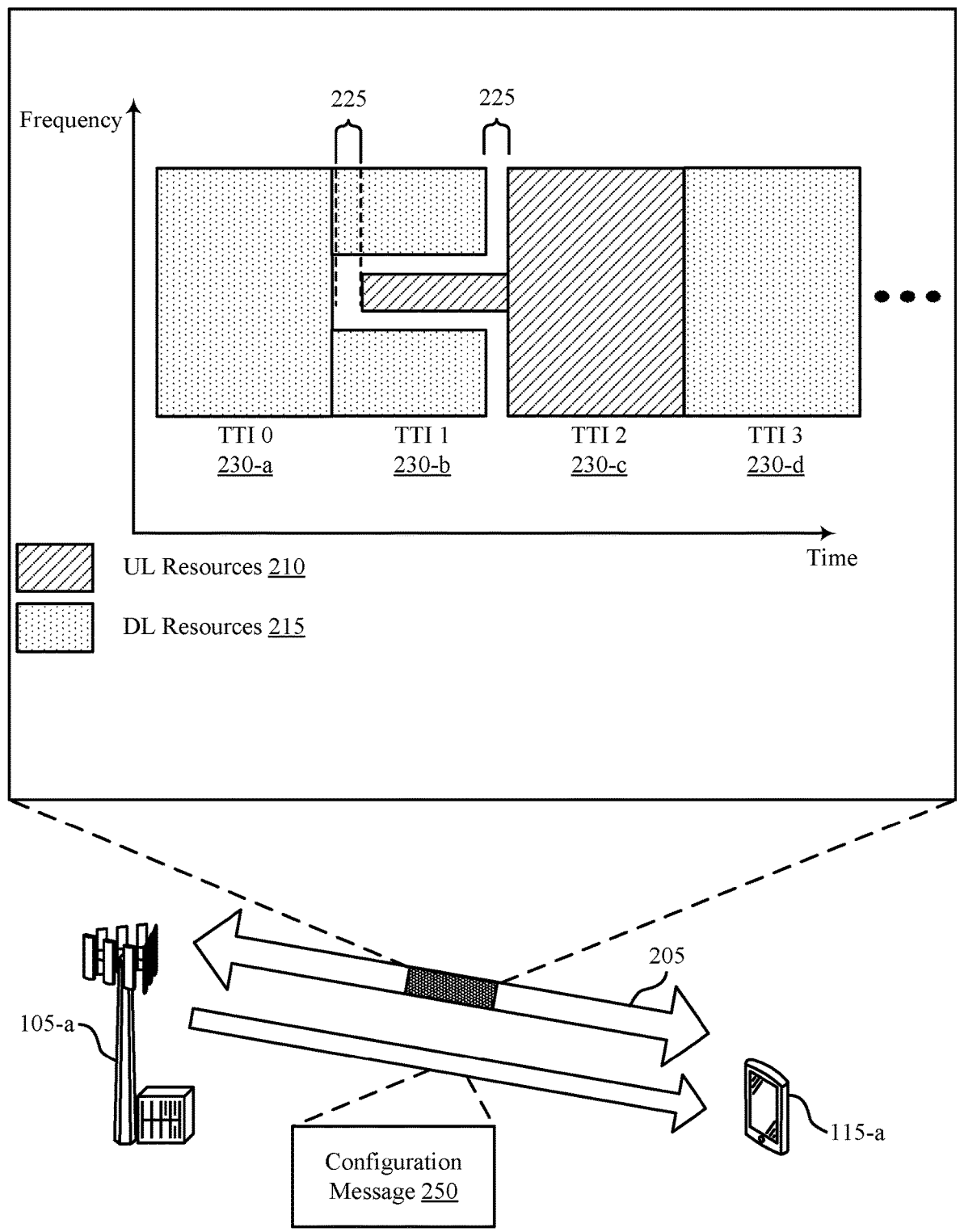
FIG. 2 illustrates an example of a wireless communications system that supports a frame structure for subband full duplex slot formats in accordance with aspects of the present disclosure.

FIG. 2 illustrates an example of a wireless communications system 200 that supports a frame structure for subband full duplex slot formats in accordance with aspects of the present disclosure. In some examples, wireless communications system 200 may implement aspects of wireless communications system 100. The wireless communications system 200 includes a UE 115-a and a base station 105-a, which may be examples of the corresponding devices of FIG. 1. Generally, the wireless communications system 200 may illustrate an example of communications 205 between the UE 115 a and the base station 105-a. The base station 105-a and the UE 115-a utilize a paired spectrum that supports communications using SBFD TTIs.

Base station 105-a may transmit a configuration message 250 that indicates a TTI format for a plurality of TTIs 230. In some examples, the configuration message 250 is based on a capability indicated by the UE 115-a. The TTIs 230 may be examples of slots or other transmission durations and may include uplink resources 210 and downlink resources 215. The TTI format for each of the TTIs 230 may indicate whether the TTI is an uplink TTI (e.g., TTI 230-c), a downlink TTI (e.g., TTIs 230-a and 230-d), a SBFD TTI (e.g., TTI 230-b), or another type of TTI. Thus, the configuration message 250 may indicate a pattern of TTI formats that may be repeated for subsequent pluralities of TTIs 230. That is, the TTI formats for TTI 230-a through 230-d may be repeated for subsequent sets of TTIs 230. The frequency domain resource partitioning for the SBFD TTI 230-b may be different than illustrated in FIG. 2. For example, the uplink resources and downlink resources may be contiguous. That is, the downlink resources may not be split by the uplink resources as illustrated in FIG. 2. In another example, the uplink resources may be positioned on either side of the downlink resources. In yet another example, the uplink resources may occupy more resources than illustrated in FIG. 2. Further, guard resources may be positioned between opposing resources in the frequency domain.

The configuration message 250 may be an example of a radio resource control (RRC) message, a medium access control, control element (MAC-CE) message, a slot format indication (SFI) message, or the like. In some examples, the configuration message 250 may include an index value that corresponds to a pattern of TTI formats (e.g., based on a look-up table). That is, the configuration message may indicate the index value, and the UE 115-*b* may identify the TTI formats for the TTIs 230 based on the index value. It should be understood that other types of TTI format indications are contemplated within the scope of the present disclosure.

Based on the configuration message 250, the UE 115-*a* may identify the TTI format pattern for the TTIs 230. The UE 115-*a* and the base station 105-*a* may also identify one or more time gaps 225 between resources that have opposing directions based on the TTI formats of the respective TTIs 230. For example, the UE 115-*a* and the base station 105-*a* may identify the time gap 225-*a* between the downlink resources 215 of TTI 230-*a* and the uplink resources 210 of the SBFD TTI 230-*b*. The time gap 225-*a* may be positioned in the frequency resources in which the uplink resources 210 and the downlink resources 215 overlap or partially overlap. As illustrated in FIG. 2, the time gaps 225 are positioned in the time domain resources of the SBFD TTI 230-*b*, but, in some cases, the time gaps 225 may be positioned in the time domain resources of the adjacent TTIs 230-*a* and/or 230-*c*.

In some examples, the duration of the time gaps 225 may depend on the size of the cell. The configuration message 250 may indicate a time gap configuration for the time gaps 225. The time gap configuration may include a specification of the time domain resources of the time gaps 225 (e.g., in the SBFD TTI 230-*b* or in one or both of the adjacent TTI 230-*a* or 230-*c*), a duration of the time gap, or a combination thereof. In the same or other examples, a scheduling message may indicate various configurations of the time gaps 225. For example, the location of the time gap may be identified based on the configuration of the TTI formats. That is, when a TTI format or pattern of TTI formats are configured at the UE 115-*a*, the UE 115-*a* may identify the location of the time gaps 225 based on the TTI format or pattern of TTI formats. In this example, a scheduling message transmitted by the base station 105-*a* may subsequently indicate a duration of the time gap, which may be based on the size of the cell.

In some examples, a transition between uplink resources 210 and downlink resources 215 may occur between an SBFD slot and an adjacent slot. In such cases, the time gap may be accounted for based on the timing advance value configured by the base station 105-*a*. Accordingly, the time gaps 225 may be explicitly configured by the configuration message 250, determined based on the TTI formats indicated by the configuration message 250, determined based on a scheduling message, or a combination thereof.

Figure 3:
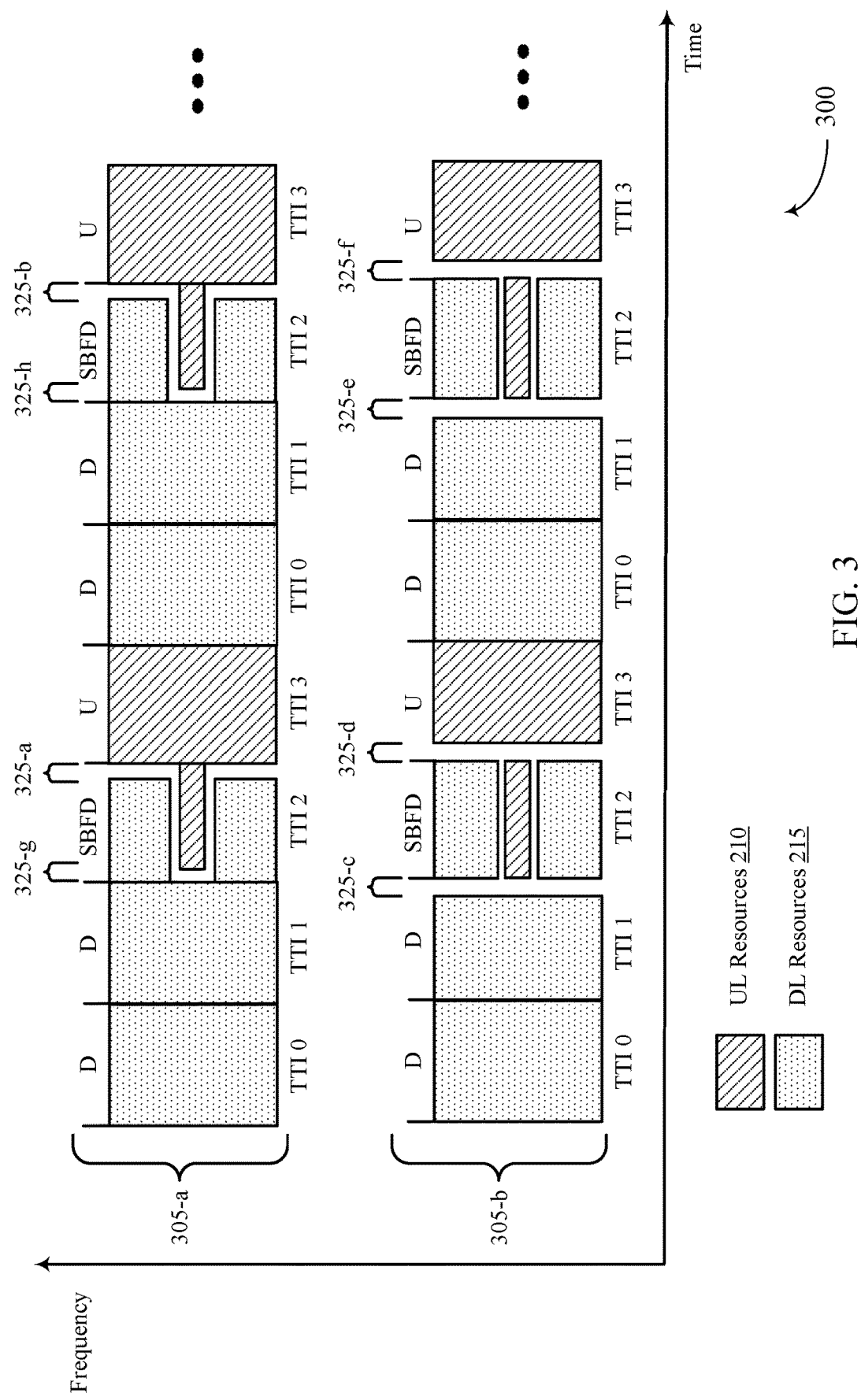
FIG. 3 illustrates examples of TTI patterns that support a frame structure for subband full duplex slot formats in accordance with aspects of the present disclosure.

FIG. 3 illustrates examples of TTI patterns 300 that support a frame structure for subband full duplex slot formats in accordance with aspects of the present disclosure. In some examples, TTI patterns 300 may be implemented by aspects of wireless communications system 100. The TTI patterns 300 may be implemented by a UE 115 and a base station 105 as described with respect to FIGS. 1 and 2. The TTI patterns 300 include a repeating pattern of TTIs or slots. The TTI formats for the TTIs may be indicated by a configuration message 250 as described with respect to FIG. 2. The TTI patterns 300 include a first set of TTIs 305-*a* and a second set of TTIs 305-*b*.

The sets of TTIs 305 include TTI formats including downlink TTIs (denoted by "D"), an SBFD TTI, and uplink TTIs (denoted by "U"). That is, the configuration message may indicate one or more downlink TTIs, one or more uplink TTIs, and one or more SBFD TTIs. A UE 115 and a base station 105 may identify time gaps 325 between opposing resources of the adjacent TTIs. For example, time gap 325-*a* is identified between downlink resources 215 of the SBFD TTI and the uplink resources 210 of the subsequent uplink TTI. The time gaps 325 may be positioned in frequency resources that at least partially overlap with the opposing resources. In the set of TTIs 305-*a*, the time gaps 325-*a*, 325-*b*, 325-*g*, and 325-*h* are positioned in the time domain resources of the SBFD TTI. However, in the set of TTIs 305-*b*, the time gaps 325-*c*, 325-*d*, 325-*e*, and 325-*f* are positioned in the time domain resources of the TTIs that are adjacent to the SBFD TTIs. It should be understood that under various configurations, the time gaps 325 may be positioned in either the SBFD TTI, the adjacent TTI, or both. For example, a time gap 325 may be positioned in the time domain resources of the SBFD TTI on a first side of the SBFD TTI and in the time domain resources of adjacent TTI on a second side of the SBFD TTI.

As described herein, the positioning of the time gaps 325, the duration of the time gaps 325, or both, may be determined based on the TTI format pattern indicated by the configuration message. That is, the time gap 325 positions may be predetermined based on the indicated pattern. In some examples, the configuration message may include an explicit indication of the positioning or duration of the time gaps 325. In other examples, the time gap 325 positioning may be identified based on the respective slot formats of adjacent TTIs. For example, the UE 115 and the base station 105 may identify that the time gaps are located between opposing resources in the frequency domain. In some cases, time gap positioning and/or duration may be indicated by a scheduling message that schedules resources for uplink or downlink communications. In some examples, the duration of the time gap may be configured to satisfy a predetermined minimum threshold, and the scheduling message may indicate a duration of the time gap 325 that is greater than the minimum threshold. Various messages or configurations may also specify whether the time gap 325 is to be positioned in an SBFD TTI or the adjacent TTI slot. Thus, the positioning may be indicated by the configuration message, the scheduling message, both the configuration message and the scheduling message, or may be a predetermined positioning. Further, the positioning or duration may depend on the capability of the UE. Thus, the configuration message or scheduling message may indicate positioning or duration of the time gaps 325 that are based on the capability of the UE.

In some cases, a transition between uplink and downlink resources between an SBFD TTI and an adjacent TTI may be determined based on a timing advance value configured by the base station 105. Accordingly, a time gap between such resources may be based on the timing advance value.

Figure 4:
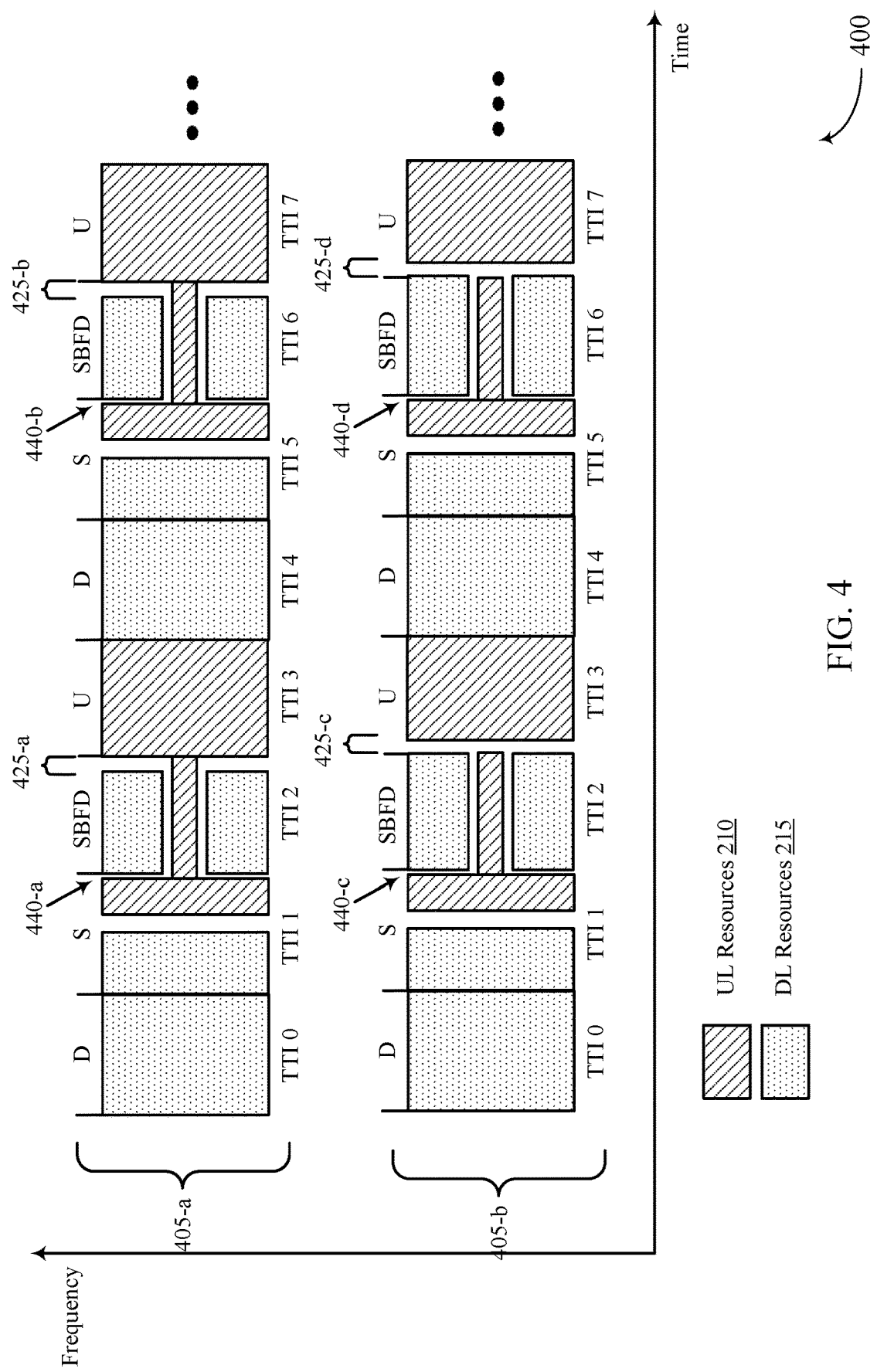
FIG. 4 illustrates an example of TTI patterns that supports a frame structure for subband full duplex slot formats in accordance with aspects of the present disclosure.

FIG. 4 illustrates an example of TTI patterns 400 that support a frame structure for subband full duplex slot formats in accordance with aspects of the present disclosure. In some examples, TTI patterns 400 may be implemented by aspects of wireless communications system 100. The TTI patterns 400 may be implemented by a UE 115 and a base station 105 as described with respect to FIGS. 1 and 2. The TTI patterns 400 include a repeating pattern of TTIs or slots. The TTI formats for the TTIs may be indicated by a configuration message 250 as described with respect to FIG. 2. The TTI patterns 400 include a first set of TTIs 405-*a* and a second set of TTIs 405-*b*.

The sets of TTIs 405 include TTI formats including downlink TTIs (denoted by "D"), an SBFD TTI, uplink TTIs (denoted by "U"), and one or more flexible TTIs (denoted by "S"). The flexible TTIs may be used for transitioning between downlink TTIs and uplink TTIs and may include downlink resources 215 and uplink resources 210 separated in the time domain. Thus, a configuration message may indicate one or more downlink TTIs, one or more uplink TTIs, one or more SBFD TTIs, and one or more flexible TTIs. A UE 115 and a base station 105 may identify time gaps 425 between opposing resources of the adjacent TTIs. For example, time gap 425-*a* is identified between downlink resources 215 of the SBFD TTI and uplink resources 210 of the subsequent uplink TTI. The time gaps 425 may be positioned in frequency resources that at least partially overlap with the opposing resources. In the set of TTIs 405-*a*, the time gaps 425-*a* and 425-*b* are positioned in the time domain resources of the SBFD TTI. However, in the set of TTIs 405-*b*, the time gaps 425-*c* and 425-*d* are positioned in the time domain resources of the TTIs that are adjacent to the SBFD TTIs. It should be understood that under various configurations, the time gaps 425 may be positioned in either the SBFD TTI, the adjacent TTI, or both. For example, a time gap 425 may be positioned in the time domain resources of the SBFD TTI on a first side of the SBFD TTI and in the time domain resources of adjacent TTI on a second side of the SBFD TTI.

As described herein, the positioning of the time gaps 425, the duration of the time gaps 425, or both, may be determined based on the TTI format pattern indicated by the configuration message. That is, the time gap 425 positions may be predetermined based on the indicated pattern. In some examples, the configuration message may include an explicit indication of the positioning or duration of the time gaps 425. In other examples, the time gap 425 positioning may be identified based on the respective slot formats of adjacent TTIs. For example, the UE 115 and the base station 105 may identify that the time gaps are located between opposing resources in the frequency domain. In some cases, time gap positioning and/or duration may be indicated by a scheduling message that schedules resources for uplink or downlink communications. In some examples, the duration of the time gap may be configured to satisfy a predetermined minimum threshold, and the scheduling message may indicate a duration of the time gap 425 that is greater than the minimum threshold. The duration may also depend on a cell size, and thus the scheduling message may indicate the duration based on the cell size. Various messages or configurations may also specify whether the time gap 425 is to be positioned in an SBFD TTI or the adjacent TTI slot. Thus, the positioning may be indicated by the configuration message, the scheduling message, both the configuration message and the scheduling message, or may be a predetermined positioning. Further, the positioning or duration may depend on the capability of the UE. Thus, the configuration message or scheduling message may indicate positioning or duration of the time gaps 425 that are based on the capability of the UE.

In some cases, a transition between uplink and downlink resources between an SBFD TTI and an adjacent TTI may be determined based on a timing advance value configured by the base station 105. Thus, the time gaps 440, such as time gaps 440-*a*, 440-*b*, 440-*c*, and 440-*d*, which are positioned between uplink resources 210 of a flexible TTI and downlink resources of the SBFD TTIs, may be configured in accordance with a timing advance value signaled by the base station 105. Other transitions based on the timing advance value are contemplated. For example, a downlink TTI may be positioned subsequent to the SBFD TTIs. In such cases, there may be a transmission between the uplink resources 210 of the SBFD TTI and the downlink resources 215 of the subsequent downlink TTI. In such cases, the time gap 440 may be based on a timing advance value configured by the base station. Further, the duration of the timing advance value may be based on the capability of the UE to transition between uplink and downlink communications.

Figure 5:
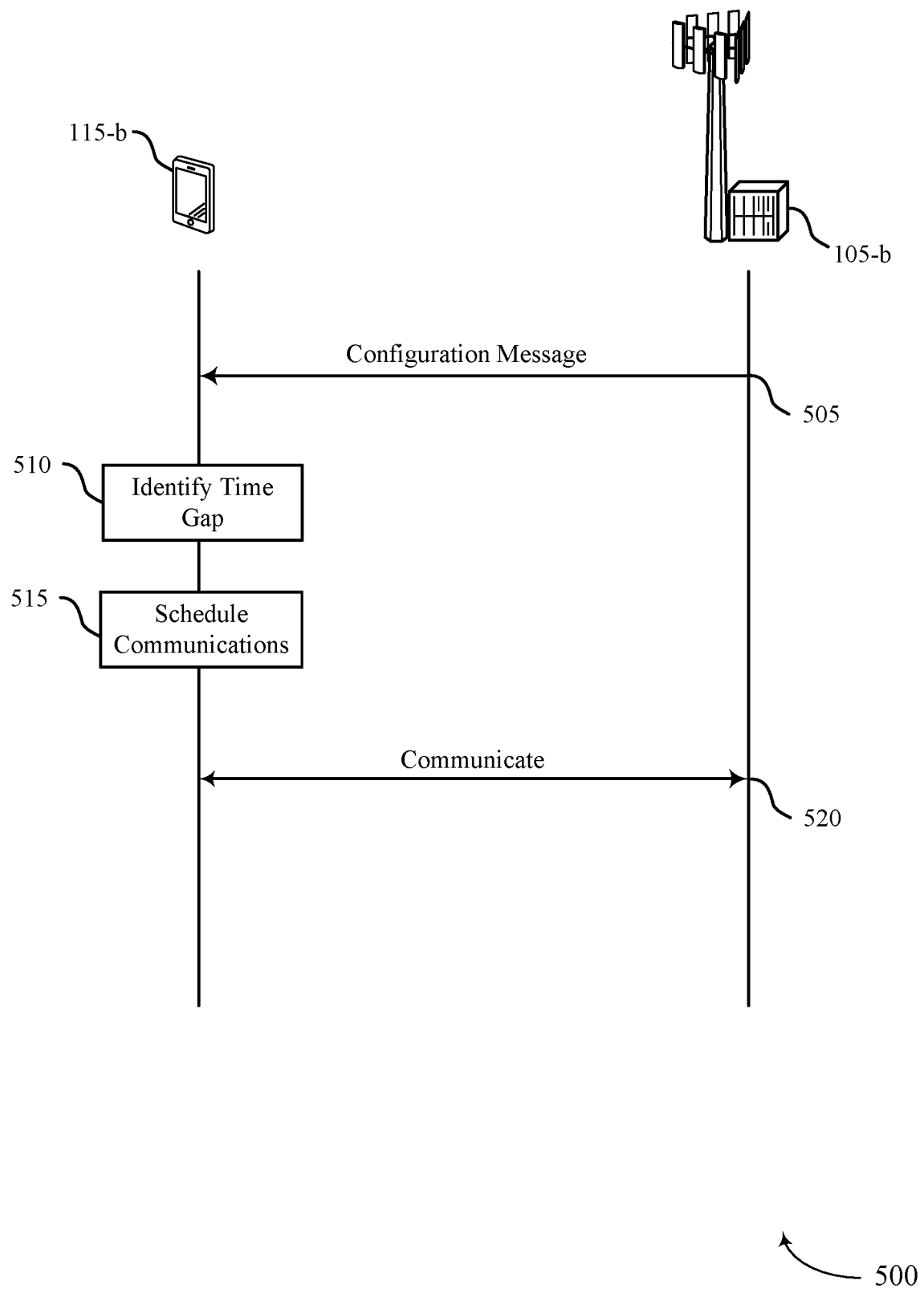
FIG. 5 illustrates an example of a process flow diagram that supports a frame structure for subband full duplex slot formats in accordance with aspects of the present disclosure.

FIG. 5 illustrates an example of a process flow diagram 500 that supports a frame structure for subband full duplex slot formats in accordance with aspects of the present disclosure. In some examples, process flow diagram 500 may implement aspects of wireless communications system 100. The process flow diagram includes a UE 115-*b* and base station 105-*b*, which may be examples of the corresponding devices as described with respect to FIGS. 1 through 4.

At 505, the UE 115-*b* receives, from the base station 105-*b*, a configuration message indicating a TTI format for each TTI of a plurality of TTIs. The plurality of TTIs may include a first TTI having a TTI format specifying an uplink resource and a downlink resource separated in a frequency domain. The configuration message may indicate that the plurality of TTIs includes one or more uplink TTIs and one or more downlink TTIs in addition to the first TTI. The configuration message may indicate the plurality of TTIs includes one or more uplink TTIs, one or more downlink TTIs, and one or more TTIs including an uplink resource and a downlink resource separated in a time domain (e.g., a flexible TTI).

At 510, the UE 115-*b* identifies a time gap between the uplink resource or the downlink resource of the first TTI and a resource of a second TTI of the plurality of TTIs that is configured for transmission in a direction opposite to the uplink resource or the downlink resource. The second TTI may be adjacent in time to the first TTI. In some examples, the time gap is identified based on a predetermined configuration and based on the TTI formats indicated by the configuration message. In other cases, the configuration message may explicitly indicate the time gap configuration. In other cases, the time gap configuration may be indicated by a scheduling message transmitted by the base station 105-*b*.

At 515, the UE 115-*b* schedules communications with the base station 105-*b* in the first TTI and the second TTI based at least in part on the TTI format of the first TTI and the time gap. The communications may be scheduled in accordance with a scheduling message received from the base station 105-*b*. The scheduling message may be an example of an SPS message, an uplink configured grant, a downlink control information (DCI) message, an RRC message, an SFI message, or a combination thereof. As described, the scheduling message may include various configurations for the time gaps such as a time gap duration, which may be based on the UE capability and/or the size of the cell.

At 520, the UE 115-*b* may communicate with the base station 105-*b* during the first TTI and the second TTI in accordance with the scheduling. The communications may include transmitting uplink communications, receiving downlink communications, etc. during the resources of the first slot, the second slot, or both.

Figure 6:
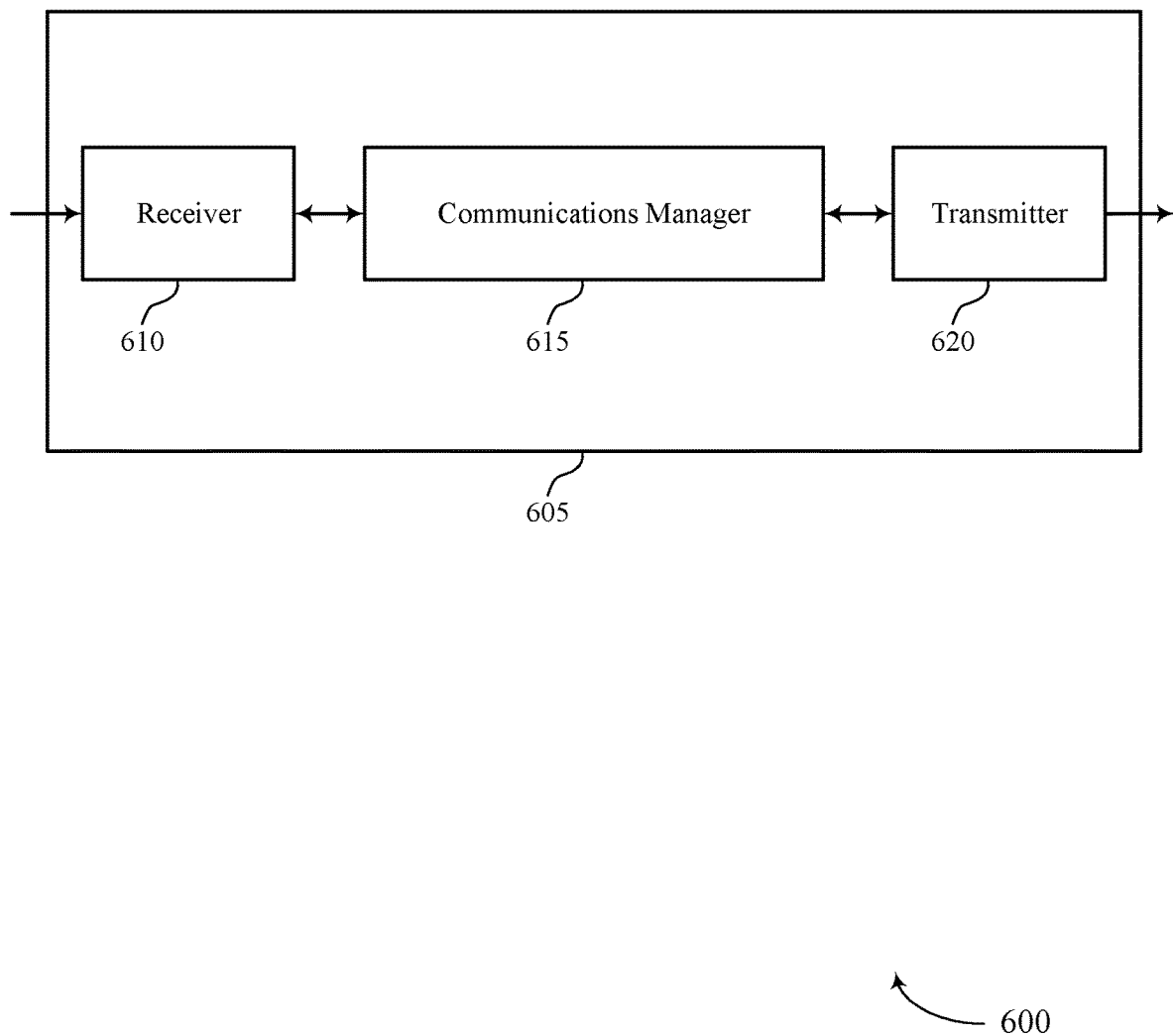
FIGS. 6 and 7 show block diagrams of devices that support frame structure for subband full duplex slot formats in accordance with aspects of the present disclosure.

FIG. 6 shows a block diagram 600 of a device 605 that supports a frame structure for subband full duplex slot formats in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to frame structure for subband full duplex slot formats, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a configuration message indicating a TTI format for each TTI of a set of TTIs that includes a first TTI having a TTI format specifying an uplink resource and a downlink resource separated in a frequency domain, identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, schedule communications with the base station in the first TTI and the second TTI based on the TTI format of the first TTI and the time gap, and communicate with the base station during the first TTI and the second TTI in accordance with the scheduling. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to more efficiently coordinate communications during TTIs that include at least one SBFD slot, and more specifically to identify time gaps between opposing resources in a SBFD slot and an adjacent slot.

Based on implementing the time gap identification techniques as described herein, a processor of a UE 115 (e.g., controlling the receiver 610, the transmitter 620, or the transceiver 920 as described with reference to FIG. 9) may increase reliability and decrease signaling overhead in the communication during resources because the resources are identified with reference to the time gaps.

Figure 7:
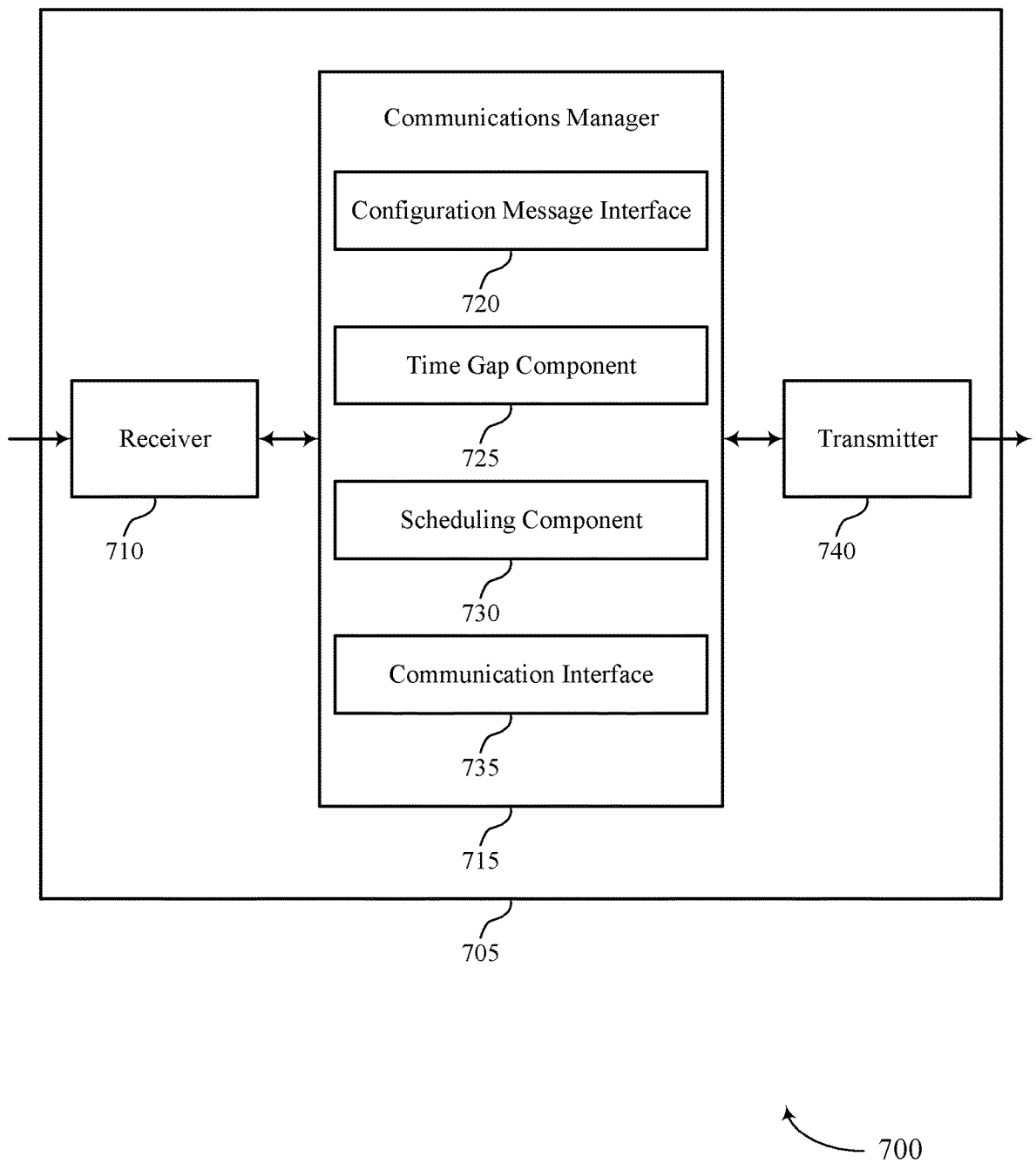

FIG. 7 shows a block diagram 700 of a device 705 that supports a frame structure for subband full duplex slot formats in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to frame structure for subband full duplex slot formats, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration message interface 720, a time gap component 725, a scheduling component 730, and a communication interface 735. The communications manager 715 may be an example of aspects of the communications manager 910 described herein.

The configuration message interface 720 may receive, from a base station, a configuration message indicating a TTI format for each TTI of a set of TTIs that includes a first TTI having a TTI format specifying an uplink resource and a downlink resource separated in a frequency domain.

The time gap component 725 may identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI.

The scheduling component 730 may schedule communications with the base station in the first TTI and the second TTI based on the TTI format of the first TTI and the time gap. The communication interface 735 may communicate with the base station during the first TTI and the second TTI in accordance with the scheduling.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
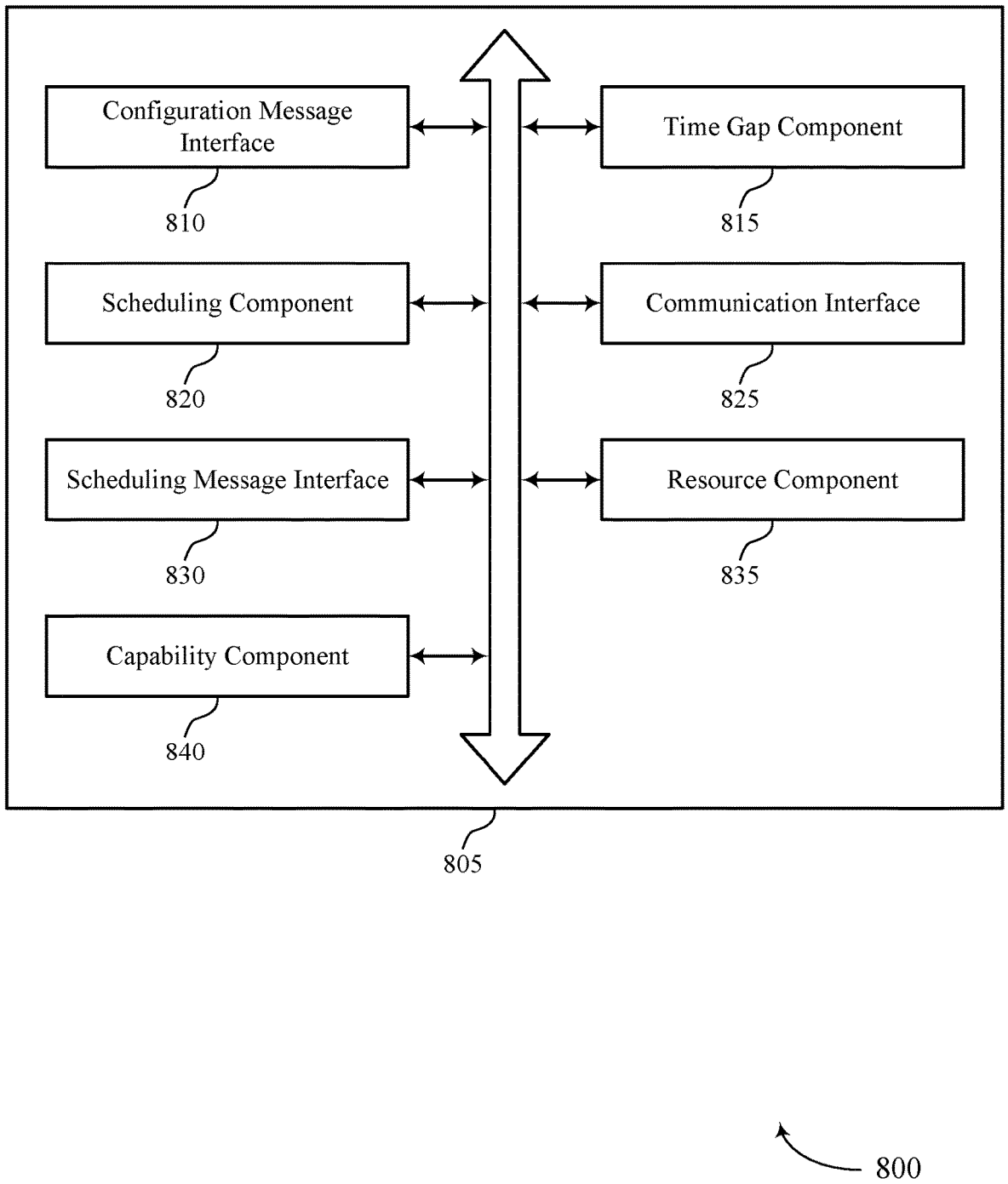
FIG. 8 shows a block diagram of a communications manager that supports a frame structure for subband full duplex slot formats in accordance with aspects of the present disclosure.

FIG. 8 shows a block diagram 800 of a communications manager 805 that supports a frame structure for subband full duplex slot formats in accordance with aspects of the present disclosure. The communications manager 805 may be an example of aspects of a communications manager 615, a communications manager 715, or a communications manager 910 described herein. The communications manager 805 may include a configuration message interface 810, a time gap component 815, a scheduling component 820, a communication interface 825, a scheduling message interface 830, a resource component 835, and a capability component 840. Each of these modules may communicate, directly or indirectly, with one another (e.g., via one or more buses).

The configuration message interface 810 may receive, from a base station, a configuration message indicating a TTI format for each TTI of a set of TTIs that includes a first TTI having a TTI format specifying an uplink resource and a downlink resource separated in a frequency domain.

In some examples, the configuration message interface 810 may receive the configuration message that indicates a time gap configuration, where the time gap is identified based on the time gap configuration.

In some examples, receiving the configuration message that indicates the set of TTIs includes one or more uplink TTIs and one or more downlink TTIs, where the time gap is identified based on the configuration message.

In some examples, receiving the configuration message that indicates the set of TTIs includes one or more uplink TTIs, one or more downlink TTIs, and one or more TTIs including an uplink resource and a downlink resource separated in a time domain, where the time gap is identified based on the configuration message.

In some examples, the configuration message interface 810 may receive the configuration message that indicates the second TTI is a downlink TTI. In some examples, the configuration message interface 810 may receive the configuration message that indicates a time gap configuration for the time gap, where the time gap is identified based on the time gap configuration.

In some examples, the configuration message interface 810 may receive the configuration message that indicates the second TTI is an uplink TTI or a TTI including the uplink resource and a downlink resource separated in a time domain. In some examples, the configuration message interface 810 may receive the configuration message that indicates a time gap configuration for the time gap based on the UE capability.

The time gap component 815 may identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI.

In some examples, the time gap component 815 may identify the time gap based on the TTI format of the first TTI and the TTI format of the second TTI.

In some examples, the time gap component 815 may identify that the time gap is located in a time domain resource of the first TTI and at least partially overlaps with the uplink resource or the downlink resource of the first TTI and the resource of the second TTI in the frequency domain.

In some examples, the time gap component 815 may identify that the time gap is located in a time domain resource of the second TTI and at least partially overlaps with the uplink resource or the downlink resource of the first TTI and the resource of the second TTI in the frequency domain.

The scheduling component 820 may schedule communications with the base station in the first TTI and the second TTI based on the TTI format of the first TTI and the time gap.

In some examples, the scheduling component 820 may receive, from the base station, a scheduling message that schedules the communications in the uplink resource or the downlink resource of the first TTI and the resource of the second TTI, where the time gap is identified based on the uplink resource or the downlink resource of the first TTI at least partially overlapping in the frequency domain with the resource of the second TTI.

The communication interface 825 may communicate with the base station during the first TTI and the second TTI in accordance with the scheduling. The scheduling message interface 830 may receive, from the base station, a scheduling message that schedules the communications for the first TTI and the second TTI, where the time gap is identified based on the scheduling message.

The resource component 835 may identify that the resource of the second TTI is a downlink resource, where the time gap is identified between the downlink resource of the second TTI and the uplink resource of the first TTI.

In some examples, the resource component 835 may identify that the resource of the second TTI is an uplink resource, where the time gap is identified between the uplink resource of the second TTI and the downlink resource of the first TTI.

In some cases, the first TTI follows the second TTI. In some cases, the second TTI follows the first TTI and the time gap includes a timing advance value. In some cases, the second TTI follows the first TTI. In some cases, the first TTI follows the second TTI and the time gap includes a timing advance value.

The capability component 840 may transmit, to the base station, an indication of a UE capability of the UE, where the time gap is identified based on the indication of the UE capability.

Figure 9:
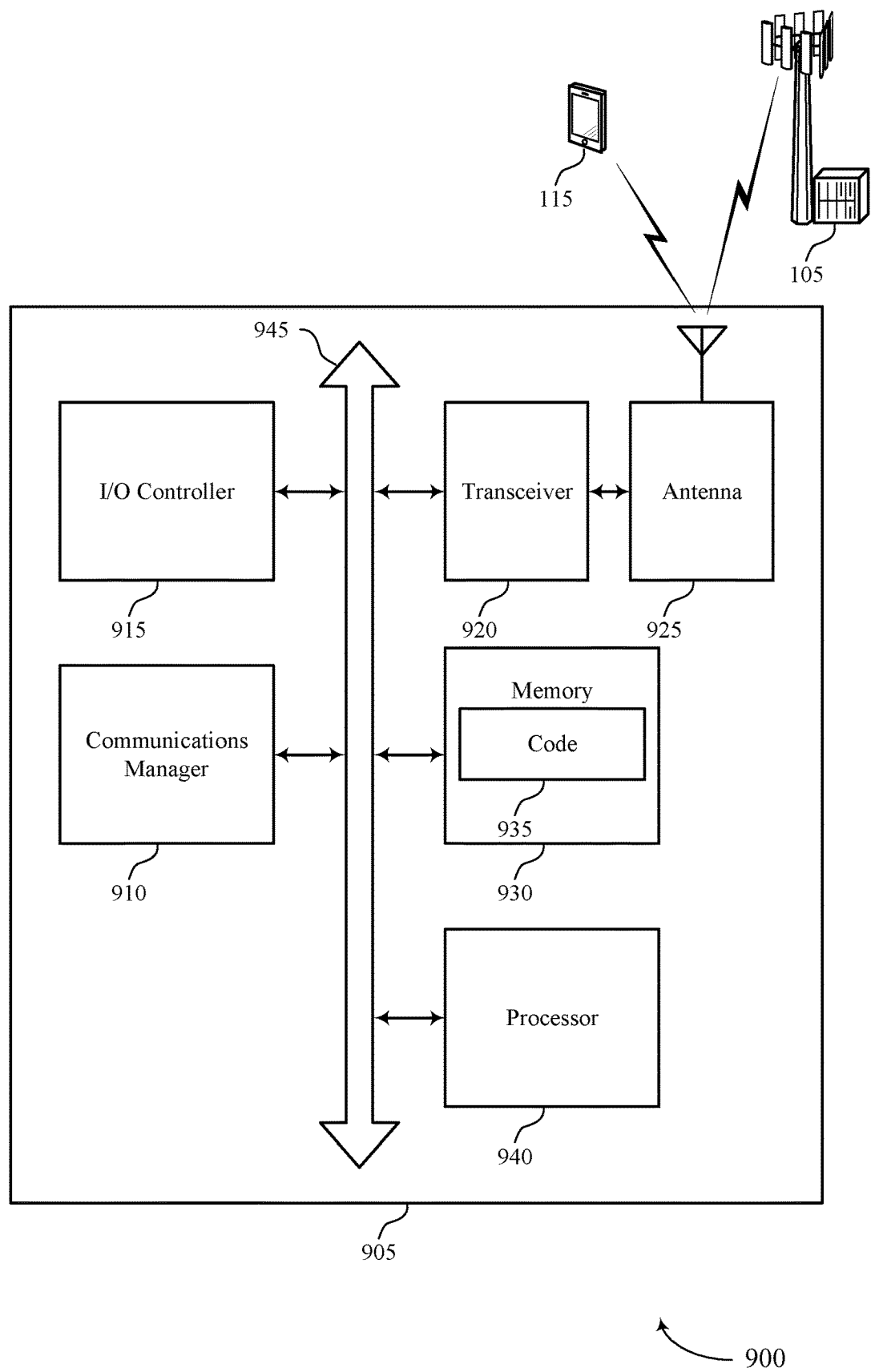
FIG. 9 shows a diagram of a system including a device that supports a frame structure for subband full duplex slot formats in accordance with aspects of the present disclosure.

FIG. 9 shows a diagram of a system 900 including a device 905 that supports a frame structure for subband full duplex slot formats in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a configuration message indicating a TTI format for each TTI of a set of TTIs that includes a first TTI having a TTI format specifying an uplink resource and a downlink resource separated in a frequency domain, identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, schedule communications with the base station in the first TTI and the second TTI based on the TTI format of the first TTI and the time gap, and communicate with the base station during the first TTI and the second TTI in accordance with the scheduling.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting frame structure for subband full duplex slot formats).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
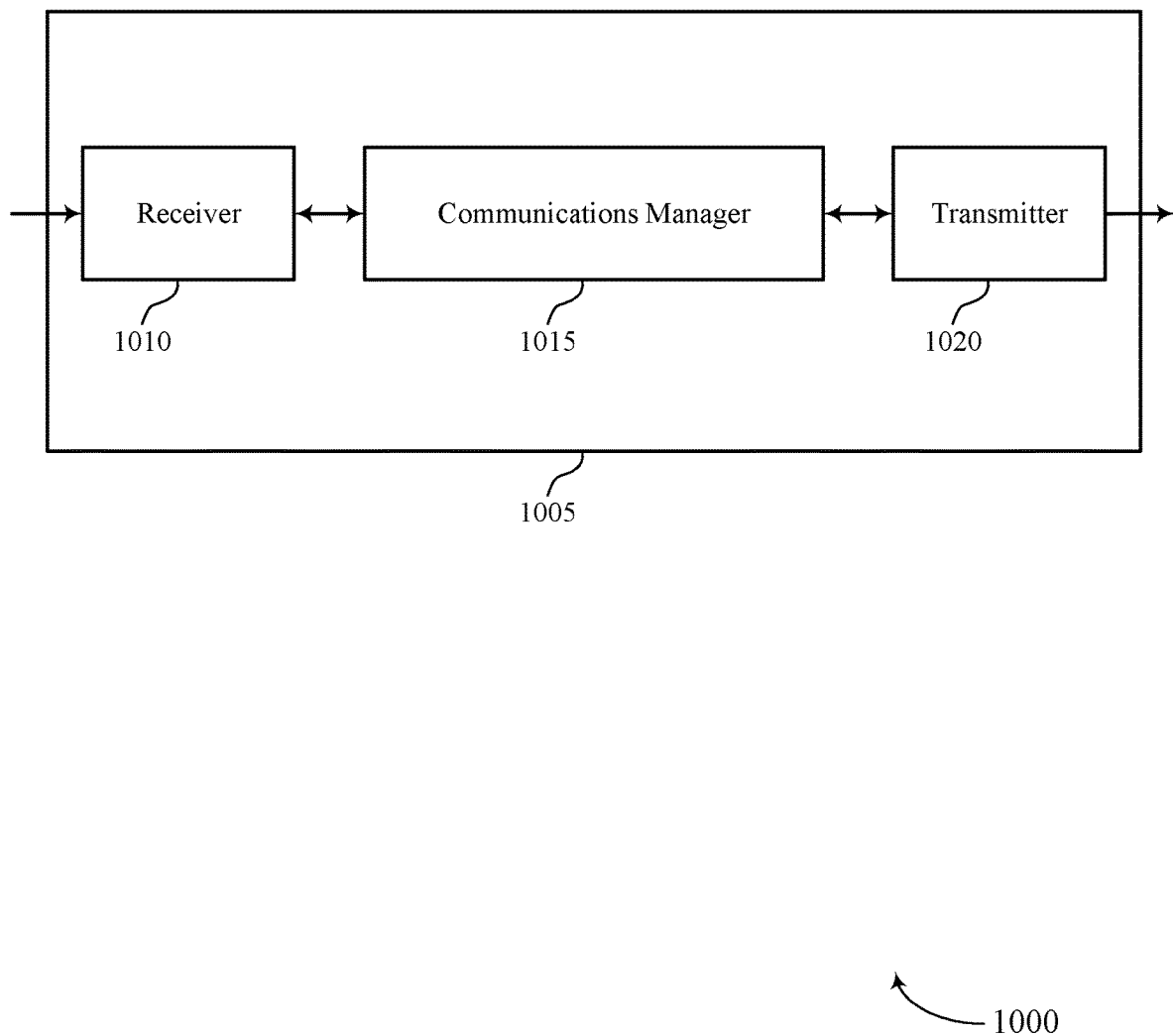
FIGS. 10 and 11 show block diagrams of devices that support frame structure for subband full duplex slot formats in accordance with aspects of the present disclosure.

FIG. 10 shows a block diagram 1000 of a device 1005 that supports a frame structure for subband full duplex slot formats in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to frame structure for subband full duplex slot formats, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a configuration message indicating a TTI format for each TTI of a set of TTIs that includes a first TTI having a TTI format an uplink resource and a downlink resource separated in a frequency domain, identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, schedule communications with the UE in the first TTI and the second TTI based on the TTI format of the first TTI, and the time gap, and communicate with the UE during the first TTI and the second TTI in accordance with the scheduling. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
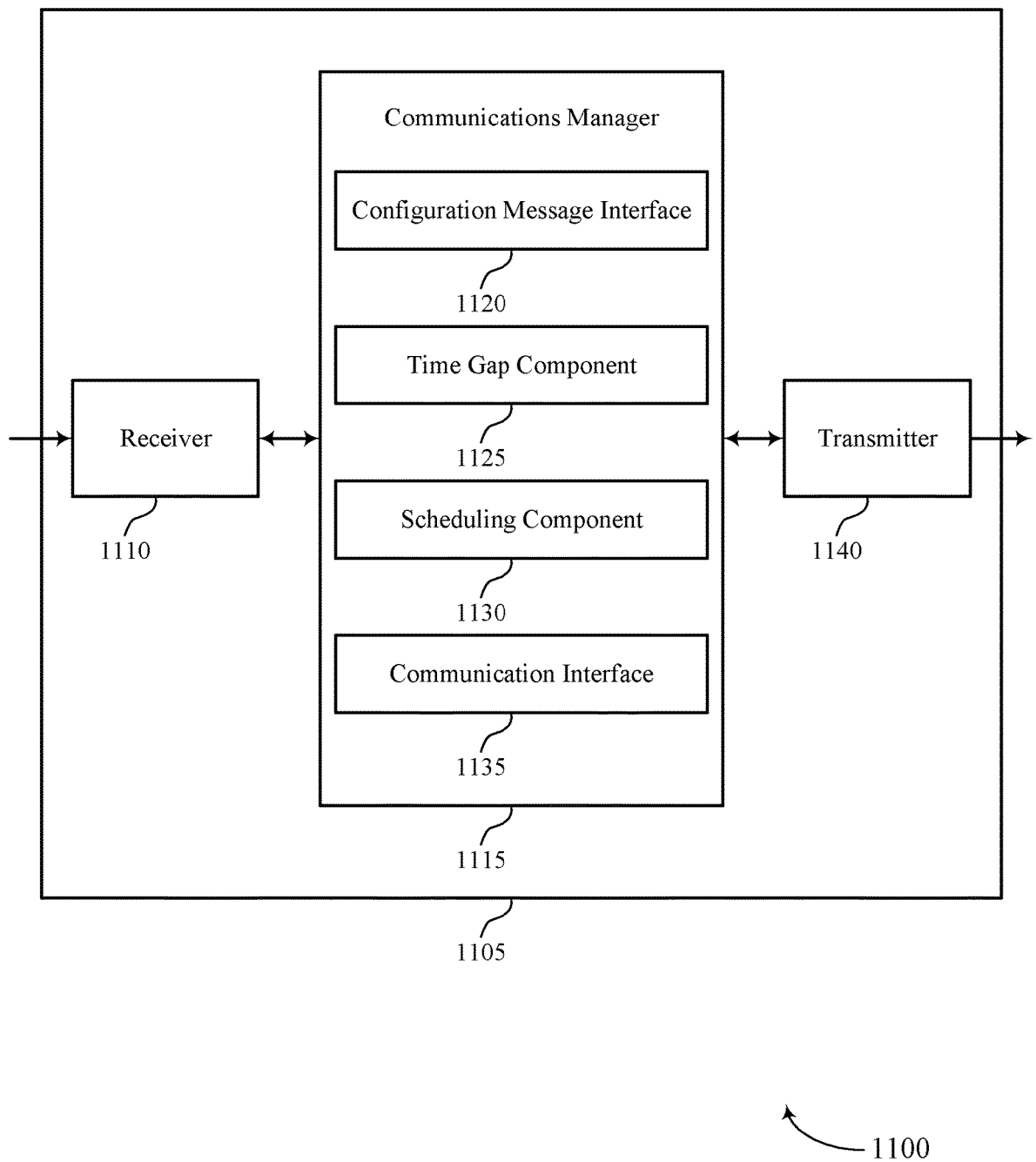

FIG. 11 shows a block diagram 1100 of a device 1105 that supports a frame structure for subband full duplex slot formats in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to frame structure for subband full duplex slot formats, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration message interface 1120, a time gap component 1125, a scheduling component 1130, and a communication interface 1135. The communications manager 1115 may be an example of aspects of the communications manager 1310 described herein.

The configuration message interface 1120 may transmit, to a UE, a configuration message indicating a TTI format for each TTI of a set of TTIs that includes a first TTI having a TTI format an uplink resource and a downlink resource separated in a frequency domain.

The time gap component 1125 may identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI.

The scheduling component 1130 may schedule communications with the UE in the first TTI and the second TTI based on the TTI format of the first TTI, and the time gap. The communication interface 1135 may communicate with the UE during the first TTI and the second TTI in accordance with the scheduling.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
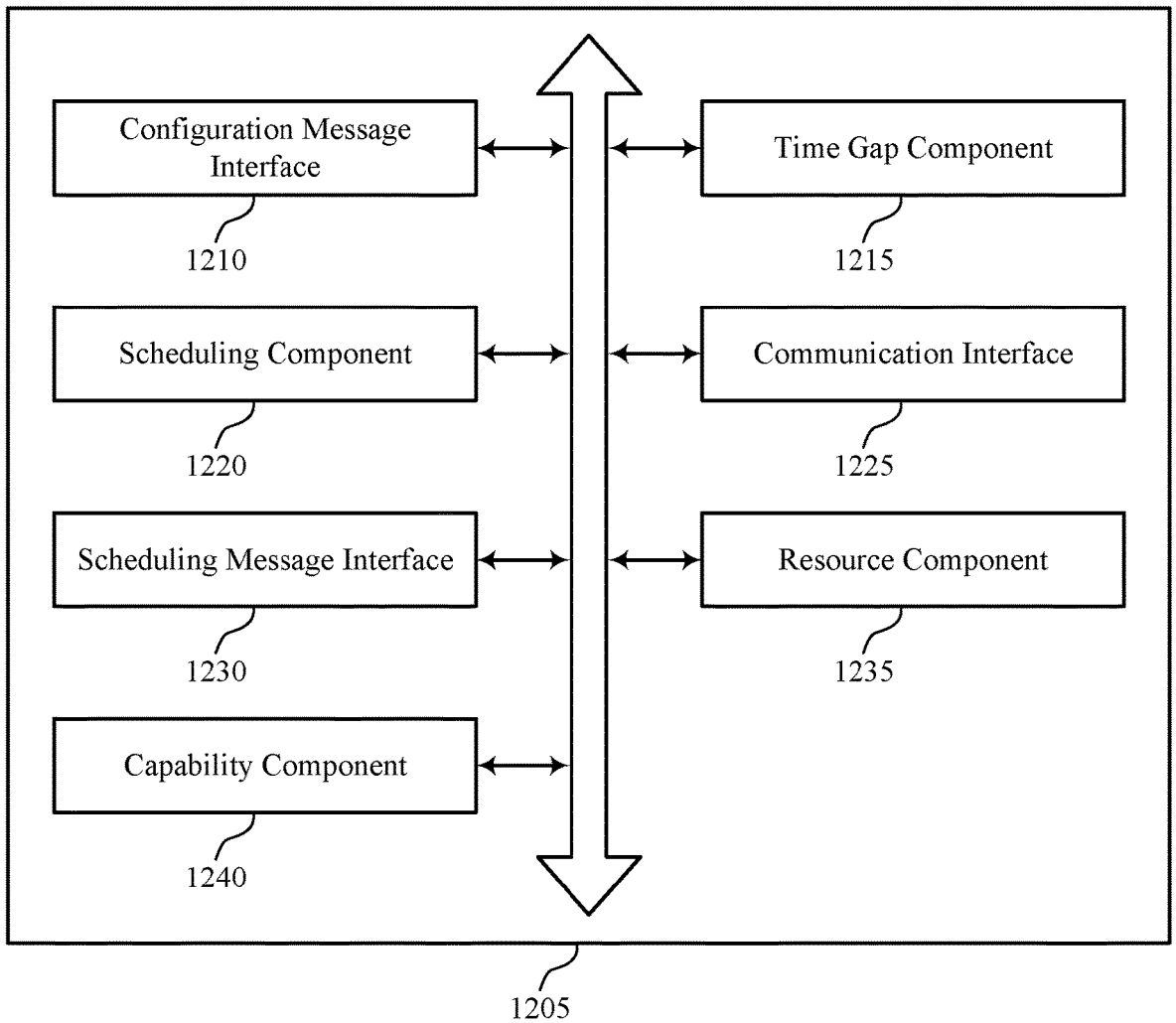
FIG. 12 shows a block diagram of a communications manager that supports a frame structure for subband full duplex slot formats in accordance with aspects of the present disclosure.

FIG. 12 shows a block diagram 1200 of a communications manager 1205 that supports a frame structure for subband full duplex slot formats in accordance with aspects of the present disclosure. The communications manager 1205 may be an example of aspects of a communications manager 1015, a communications manager 1115, or a communications manager 1310 described herein. The communications manager 1205 may include a configuration message interface 1210, a time gap component 1215, a scheduling component 1220, a communication interface 1225, a scheduling message interface 1230, a resource component 1235, and a capability component 1240. Each of these modules may communicate, directly or indirectly, with one another (e.g., via one or more buses).

The configuration message interface 1210 may transmit, to a UE, a configuration message indicating a TTI format for each TTI of a set of TTIs that includes a first TTI having a TTI format an uplink resource and a downlink resource separated in a frequency domain.

In some examples, transmitting the configuration message that indicates that the set of TTIs includes one or more uplink TTIs and one or more downlink TTIs.

In some examples, transmitting the configuration message that indicates that the set of TTIs includes one or more uplink TTIs, one or more downlink TTIs, and one or more TTIs including an uplink resource and a downlink resource separated in a time domain.

In some examples, the configuration message interface 1210 may transmit the configuration message that indicates the second TTI is a downlink TTI. In some examples, the configuration message interface 1210 may transmit the configuration message that indicates a time gap configuration for the time gap, where the time gap is identified based on the time gap configuration.

In some examples, the configuration message interface 1210 may transmit the configuration message that indicates the second TTI is an uplink TTI or a TTI including the uplink resource and a downlink resource separated in a time domain.

The time gap component 1215 may identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI.

In some examples, the time gap component 1215 may identify the time gap based on the TTI format of the first TTI and the TTI format of the second TTI. In some examples, the time gap component 1215 may identify the time gap based on a time gap configuration indicated in the configuration message.

In some examples, the time gap component 1215 may identify that the time gap is located in a time domain resource of the first TTI and at least partially overlaps with the uplink resource or the downlink resource of the first TTI and the resource of the second TTI in the frequency domain.

In some examples, the time gap component 1215 may identify that the time gap is located in a time domain resource of the second TTI and at least partially overlaps with the uplink resource or the downlink resource of the first TTI and the resource of the second TTI in the frequency domain.

The scheduling component 1220 may schedule communications with the UE in the first TTI and the second TTI based on the TTI format of the first TTI, and the time gap. The communication interface 1225 may communicate with the UE during the first TTI and the second TTI in accordance with the scheduling.

The scheduling message interface 1230 may transmit, to the UE, a scheduling message that schedules the communications for the first TTI and the second TTI, where the time gap is identified based on the scheduling message.

In some examples, the scheduling message interface 1230 may transmit, to the UE, a scheduling message that schedules the communications in the uplink resource or the downlink resource of the first TTI and the resource of the second TTI, where the time gap is identified based on the uplink resource or the downlink resource of the first TTI at least partially overlapping in the frequency domain with the resource of the second TTI.

The resource component 1235 may identify that the resource of the second TTI is a downlink resource, where the time gap is identified between the downlink resource of the second TTI and the uplink resource of the first TTI.

In some examples, the resource component 1235 may identify that the resource of the second TTI is an uplink resource, where the time gap is identified between the uplink resource of the second TTI and the downlink resource of the first TTI.

In some cases, the first TTI follows the second TTI. In some cases, the second TTI follows the first TTI and the time gap includes a timing advance value. In some cases, the second TTI follows the first TTI. In some cases, the first TTI follows the second TTI and the time gap includes a timing advance value.

The capability component 1240 may receive, from the UE, an indication of a UE capability of the UE, where the time gap is identified based on the indication of the UE capability.

In some examples, the capability component 1240 may determine a time gap configuration for the time gap based on the UE capability, where the configuration message indicates the time gap configuration for the time gap.

Figure 13:
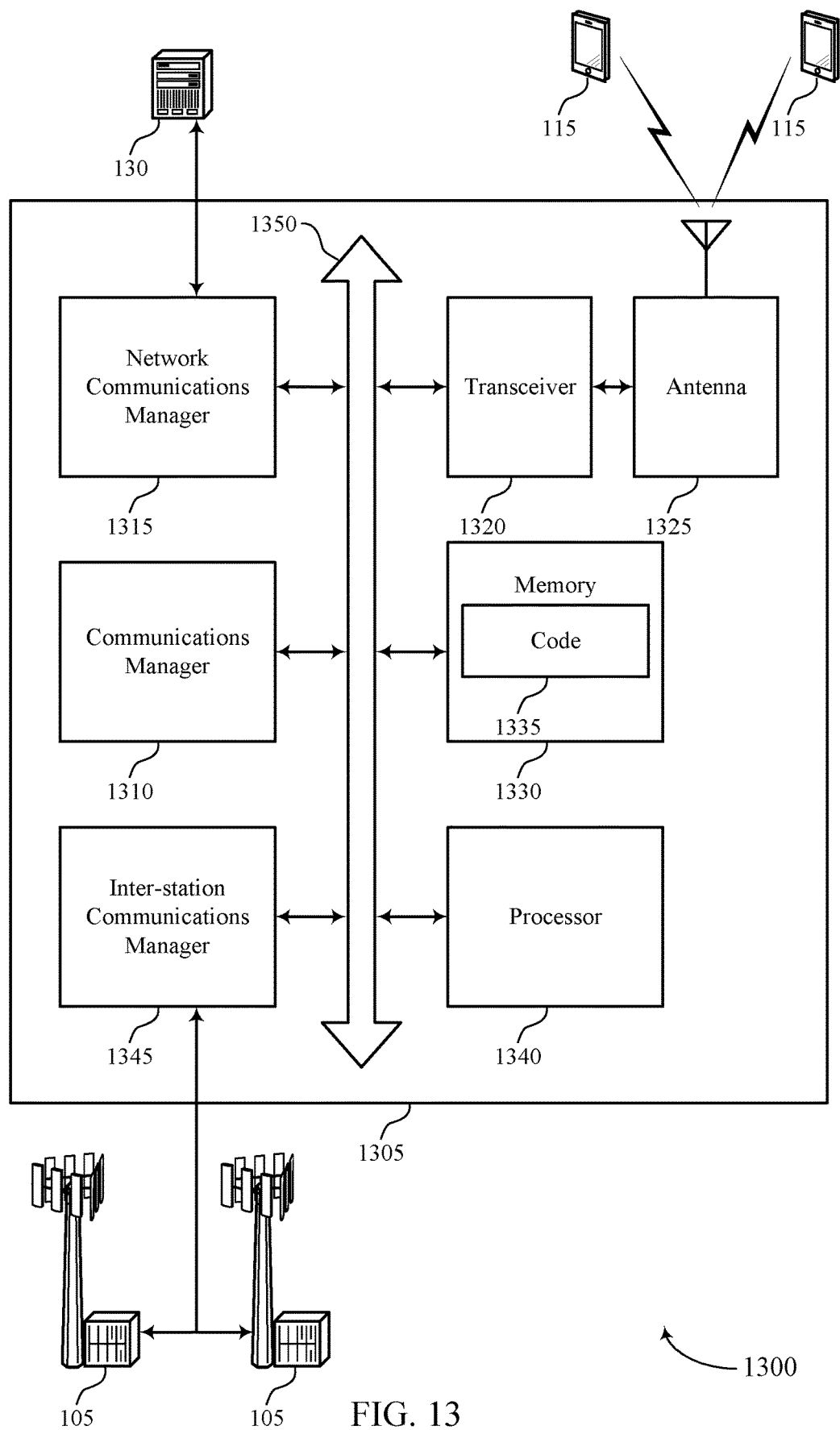
FIG. 13 shows a diagram of a system including a device that supports a frame structure for subband full duplex slot formats in accordance with aspects of the present disclosure.

FIG. 13 shows a diagram of a system 1300 including a device 1305 that supports a frame structure for subband full duplex slot formats in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a configuration message indicating a TTI format for each TTI of a set of TTIs that includes a first TTI having a TTI format an uplink resource and a downlink resource separated in a frequency domain, identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI, schedule communications with the UE in the first TTI and the second TTI based on the TTI format of the first TTI, and the time gap, and communicate with the UE during the first TTI and the second TTI in accordance with the scheduling.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting frame structure for subband full duplex slot formats).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
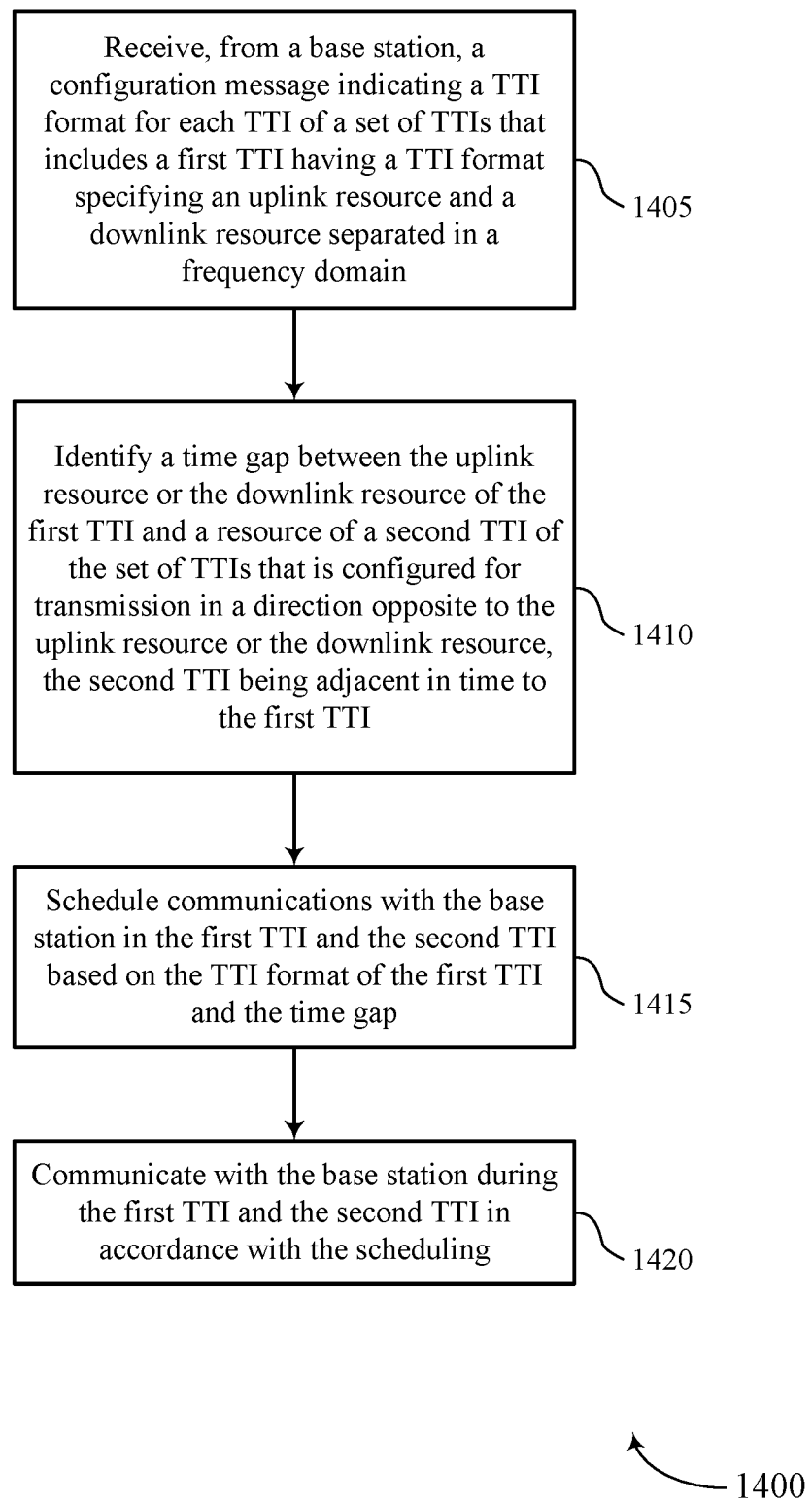
FIGS. 14 and 15 show flowcharts illustrating methods that support frame structure for subband full duplex slot formats in accordance with aspects of the present disclosure.

FIG. 14 shows a flowchart illustrating a method 1400 that supports a frame structure for subband full duplex slot formats in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration message indicating a TTI format for each TTI of a set of TTIs that includes a first TTI having a TTI format specifying an uplink resource and a downlink resource separated in a frequency domain. The operations of 1405 may be performed according to the methods described herein. In some examples, aspects of the operations of 1405 may be performed by a configuration message interface as described with reference to FIGS. 6 through 9.

At 1410, the UE may identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI. The operations of 1410 may be performed according to the methods described herein. In some examples, aspects of the operations of 1410 may be performed by a time gap component as described with reference to FIGS. 6 through 9.

At 1415, the UE may schedule communications with the base station in the first TTI and the second TTI based on the TTI format of the first TTI and the time gap. The operations of 1415 may be performed according to the methods described herein. In some examples, aspects of the operations of 1415 may be performed by a scheduling component as described with reference to FIGS. 6 through 9.

At 1420, the UE may communicate with the base station during the first TTI and the second TTI in accordance with the scheduling. The operations of 1420 may be performed according to the methods described herein. In some examples, aspects of the operations of 1420 may be performed by a communication interface as described with reference to FIGS. 6 through 9.

Figure 15:
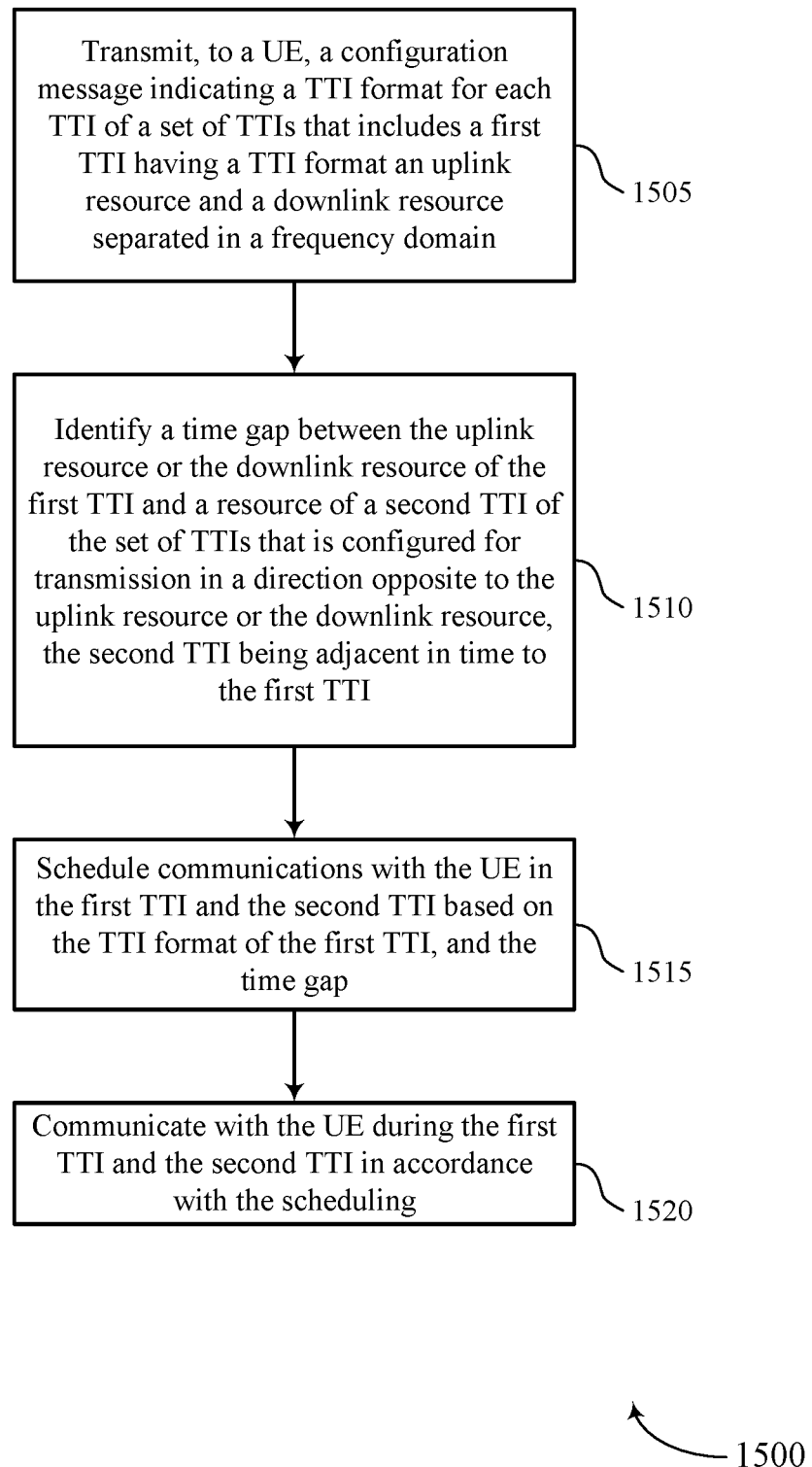

FIG. 15 shows a flowchart illustrating a method 1500 that supports a frame structure for subband full duplex slot formats in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may transmit, to a UE, a configuration message indicating a TTI format for each TTI of a set of TTIs that includes a first TTI having a TTI format an uplink resource and a downlink resource separated in a frequency domain. The operations of 1505 may be performed according to the methods described herein. In some examples, aspects of the operations of 1505 may be performed by a configuration message interface as described with reference to FIGS. 10 through 13.

At 1510, the base station may identify a time gap between the uplink resource or the downlink resource of the first TTI and a resource of a second TTI of the set of TTIs that is configured for transmission in a direction opposite to the uplink resource or the downlink resource, the second TTI being adjacent in time to the first TTI. The operations of 1510 may be performed according to the methods described herein. In some examples, aspects of the operations of 1510 may be performed by a time gap component as described with reference to FIGS. 10 through 13.

At 1515, the base station may schedule communications with the UE in the first TTI and the second TTI based on the TTI format of the first TTI, and the time gap. The operations of 1515 may be performed according to the methods described herein. In some examples, aspects of the operations of 1515 may be performed by a scheduling component as described with reference to FIGS. 10 through 13.

At 1520, the base station may communicate with the UE during the first TTI and the second TTI in accordance with the scheduling. The operations of 1520 may be performed according to the methods described herein. In some examples, aspects of the operations of 1520 may be performed by a communication interface as described with reference to FIGS. 10 through 13.

Aspect 1: A method for wireless communications at a user equipment (UE), comprising: receiving, from a base station, a configuration message indicating a TTI format for each TTI of a plurality of TTIs that includes a first TTI having a TTI format specifying an uplink resource and a downlink resource separated in a frequency domain; identifying a time gap between the uplink resource or the downlink resource of the first TTI and a resource of a second TTI of the plurality of TTIs that is configured for transmission in a direction opposite to the uplink resource or the downlink resource, the second TTI being adjacent in time to the first TTI; scheduling communications with the base station in the first TTI and the second TTI based at least in part on the TTI format of the first TTI and the time gap; and communicating with the base station during the first TTI and the second TTI in accordance with the scheduling.

Aspect 2: The method of aspect 1, wherein identifying the time gap comprises: identifying the time gap based at least in part on the TTI format of the first TTI and the TTI format of the second TTI.

Aspect 3: The method of any of aspects 1 and 2, wherein scheduling the communications comprises: receiving, from the base station, a scheduling message that schedules the communications for the first TTI and the second TTI, wherein the time gap is identified based at least in part on the scheduling message.

Aspect 4: The method of any of aspects 1 to 3, wherein receiving the configuration message comprises: receiving the configuration message that indicates a time gap configuration, wherein the time gap is identified based at least in part on the time gap configuration.

Aspect 5: The method of any of aspects 1 to 4, wherein receiving the configuration message comprises: receiving the configuration message that indicates the plurality of TTIs comprises one or more uplink TTIs and one or more downlink TTIs, wherein the time gap is identified based at least in part on the configuration message.

Aspect 6: The method of any of aspects 1 to 4, wherein receiving the configuration message comprises: receiving the configuration message that indicates the plurality of TTIs comprises one or more uplink TTIs, one or more downlink TTIs, and one or more TTIs comprising an uplink resource and a downlink resource separated in a time domain, wherein the time gap is identified based at least in part on the configuration message.

Aspect 7: The method of any of any of aspects 1 and 2 and 4 to 6, wherein scheduling the communications comprises: receiving, from the base station, a scheduling message that schedules the communications in the uplink resource or the downlink resource of the first TTI and the resource of the second TTI, wherein the time gap is identified based at least in part on the uplink resource or the downlink resource of the first TTI at least partially overlapping in the frequency domain with the resource of the second TTI.

Aspect 8: The method of any of aspects 1 to 7, wherein identifying the time gap comprises: identifying that the time gap is located in a time domain resource of the first TTI and at least partially overlaps with the uplink resource or the downlink resource of the first TTI and the resource of the second TTI in the frequency domain.

Aspect 9: The method of any of aspects 1 to 7, wherein identifying the time gap comprises: identifying that the time gap is located in a time domain resource of the second TTI and at least partially overlaps with the uplink resource or the downlink resource of the first TTI and the resource of the second TTI in the frequency domain.

Aspect 10: The method of any of aspects 1 to 9, further comprising: identifying that the resource of the second TTI is a downlink resource, wherein the time gap is identified between the downlink resource of the second TTI and the uplink resource of the first TTI.

Aspect 11: The method of any of aspects 1 to 10, receiving the configuration message comprises: receiving the configuration message that indicates the second TTI is a downlink TTI.

Aspect 12: The method of any of aspects 1 to 11, wherein receiving the configuration message comprises: receiving the configuration message that indicates a time gap configuration for the time gap, wherein the time gap is identified based at least in part on the time gap configuration.

Aspect 13: The method of any of aspects 1 to 12, wherein the first TTI follows the second TTI.

Aspect 14: The method of any of aspects 1 to 12, wherein the second TTI follows the first TTI and the time gap comprises a timing advance value.

Aspect 15: The method of any of aspects 1 to 9, further comprising: identifying that the resource of the second TTI is an uplink resource, wherein the time gap is identified between the uplink resource of the second TTI and the downlink resource of the first TTI.

Aspect 16: The method of any of aspects 1 to 9 and 15, wherein receiving the configuration message comprises: receiving the configuration message that indicates the second TTI is an uplink TTI or a TTI comprising the uplink resource and a downlink resource separated in a time domain.

Aspect 17: The method of any of aspects 1 to 9, 15, and 16, wherein receiving the configuration message comprises: receiving the configuration message that indicates a time gap configuration for the time gap, wherein the time gap is identified based at least in part on the time gap configuration.

Aspect 18: The method of any of aspects 1 to 9 and 15 to 17, wherein the second TTI follows the first TTI.

Aspect 19: The method of any of aspects 1 to 9 and 15 to 17, wherein the first TTI follows the second TTI and the time gap comprises a timing advance value.

Aspect 20: The method of any of aspects 1 to 19, further comprising: transmitting, to the base station, an indication of a UE capability of the UE, wherein the time gap is identified based at least in part on the indication of the UE capability.

Aspect 21: The method of aspect 20, wherein receiving the configuration message comprises: receiving the configuration message that indicates a time gap configuration for the time gap based at least in part on the UE capability.

Aspect 22: A method of wireless communications at a base station, comprising: transmitting, to a user equipment (UE), a configuration message indicating a transmission time interval (TTI) format for each TTI of a plurality of TTIs that includes a first TTI having a TTI format an uplink resource and a downlink resource separated in a frequency domain; identifying a time gap between the uplink resource or the downlink resource of the first TTI and a resource of a second TTI of the plurality of TTIs that is configured for transmission in a direction opposite to the uplink resource or the downlink resource, the second TTI being adjacent in time to the first TTI; scheduling communications with the UE in the first TTI and the second TTI based at least in part on the TTI format of the first TTI, and the time gap; and communicating with the UE during the first TTI and the second TTI in accordance with the scheduling.

Aspect 23: The method of aspect 21, wherein identifying the time gap comprises: identifying the time gap based at least in part on the TTI format of the first TTI and the TTI format of the second TTI.

Aspect 24: The method of aspect 22 or 23, wherein scheduling the communications comprises: transmitting, to the UE, a scheduling message that schedules the communications for the first TTI and the second TTI, wherein the time gap is identified based at least in part on the scheduling message.

Aspect 25: The method of any of aspects 22 to 24, wherein identifying the time gap comprises: identifying the time gap based at least in part on a time gap configuration indicated in the configuration message.

Aspect 26: The method of any of aspects 22 to 25, wherein the transmitting the configuration message comprises: transmitting the configuration message that indicates that the plurality of TTIs comprises one or more uplink TTIs and one or more downlink TTIs.

Aspect 27: The method of any of aspects 22 to 25, wherein transmitting the configuration message comprises: transmitting the configuration message that indicates that the plurality of TTIs comprises one or more uplink TTIs, one or more downlink TTIs, and one or more TTIs comprising an uplink resource and a downlink resource separated in a time domain.

Aspect 28: The method of any of aspects 22 to 27, wherein scheduling the communications comprises: transmitting, to the UE, a scheduling message that schedules the communications in the uplink resource or the downlink resource of the first TTI and the resource of the second TTI, wherein the time gap is identified based at least in part on the uplink resource or the downlink resource of the first TTI at least partially overlapping in the frequency domain with the resource of the second TTI.

Aspect 29: The method of any of aspects 22 to 29, wherein identifying the time gap comprises: identifying that the time gap is located in a time domain resource of the first TTI and at least partially overlaps with the uplink resource or the downlink resource of the first TTI and the resource of the second TTI in the frequency domain.

Aspect 30: The method of any of aspects 22 to 29, wherein identifying the time gap comprises: identifying that the time gap is located in a time domain resource of the second TTI and at least partially overlaps with the uplink resource or the downlink resource of the first TTI and the resource of the second TTI in the frequency domain.

Aspect 31: The method of any of aspects 22 to 30, further comprising: identifying that the resource of the second TTI is a downlink resource, wherein the time gap is identified between the downlink resource of the second TTI and the uplink resource of the first TTI.

Aspect 32: The method of any of aspects 22 to 31, wherein transmitting the configuration message comprises: transmitting the configuration message that indicates the second TTI is a downlink TTI.

Aspect 33: The method of any of aspects 22 to 32, wherein transmitting the configuration message comprises: transmitting the configuration message that indicates a time gap configuration for the time gap, wherein the time gap is identified based at least in part on the time gap configuration.

Aspect 34: The method of any of aspects 22 to 33, wherein the first TTI follows the second TTI.

Aspect 35: The method of any of aspects 22 to 33, wherein the second TTI follows the first TTI and the time gap comprises a timing advance value.

Aspect 36: The method of any of aspects 22 to 30, further comprising: identifying that the resource of the second TTI is an uplink resource, wherein the time gap is identified between the uplink resource of the second TTI and the downlink resource of the first TTI.

Aspect 37: The method of any of aspects 22 to 30 and 36, wherein transmitting the configuration message comprises: transmitting the configuration message that indicates the second TTI is an uplink TTI or a TTI comprising the uplink resource and a downlink resource separated in a time domain.

Aspect 38: The method of any of aspects 22 to 30, 36, and 37, wherein transmitting the configuration message comprises: transmitting the configuration message that indicates a time gap configuration for the time gap, wherein the time gap is identified based at least in part on the time gap configuration.

Aspect 39: The method of any of aspects 22 to 30, 36 to 38, wherein the second TTI follows the first TTI.

Aspect 40: The method of any of aspects 22 to 30, 36 to 38, wherein the first TTI follows the second TTI and the time gap comprises a timing advance value.

Aspect 41: The method of any of aspects 22 to 40, further comprising: receiving, from the UE, an indication of a UE capability of the UE, wherein the time gap is identified based at least in part on the indication of the UE capability.

Aspect 42: The method of aspect 41, further comprising: determining a time gap configuration for the time gap based at least in part on the UE capability, wherein the configuration message indicates the time gap configuration for the time gap.

Aspect 43: An apparatus comprising at least one means for performing a method of any of aspects 1 to 21.

Aspect 44: An apparatus for wireless communications comprising a processor; memory in electronic communication with the processor; and instructions stored in the memory and executable by the processor to cause the apparatus to perform a method of any of aspects 1 to 21.

Aspect 45: A non-transitory computer-readable medium storing code for wireless communications, the code comprising instructions executable by a processor to perform a method of any of aspects 1 to 21.

Aspect 46: An apparatus comprising at least one means for performing a method of any of aspects 22 to 42.

Aspect 47: An apparatus for wireless communications comprising a processor; memory in electronic communication with the processor; and instructions stored in the memory and executable by the processor to cause the apparatus to perform a method of any of aspects 22 to 42.

Aspect 48: A non-transitory computer-readable medium storing code for wireless communications, the code comprising instructions executable by a processor to perform a method of any of aspects 22 to 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a base station, a configuration message indicating a transmission time interval (TTI) format for each TTI of a plurality of TTIs that includes a first TTI having a TTI format specifying an uplink resource and a downlink resource separated in a frequency domain;
    identifying a time gap between the uplink resource or the downlink resource of the first TTI and a resource of a second TTI of the plurality of TTIs that is configured for transmission in a direction opposite to the uplink resource or the downlink resource, the second TTI being adjacent in time to the first TTI;
    scheduling communications with the base station in the first TTI and the second TTI based at least in part on the TTI format of the first TTI and the time gap; and
    communicating with the base station during the first TTI and the second TTI in accordance with the scheduling.

2. The method of claim 1, wherein identifying the time gap comprises:
    identifying the time gap based at least in part on the TTI format of the first TTI and the TTI format of the second TTI.

3. The method of claim 1, wherein receiving the configuration message comprises:
    receiving the configuration message that indicates a time gap configuration, wherein the time gap is identified based at least in part on the time gap configuration.

4. The method of claim 1, wherein scheduling the communications comprises:
    receiving, from the base station, a scheduling message that schedules the communications in the uplink resource or the downlink resource of the first TTI and the resource of the second TTI, wherein the time gap is identified based at least in part on the uplink resource or the downlink resource of the first TTI at least partially overlapping in the frequency domain with the resource of the second TTI.

5. The method of claim 1, wherein identifying the time gap comprises:
    identifying that the time gap is located in a time domain resource of the first TTI and at least partially overlaps with the uplink resource or the downlink resource of the first TTI and the resource of the second TTI in the frequency domain.

6. The method of claim 1, wherein identifying the time gap comprises:
    identifying that the time gap is located in a time domain resource of the second TTI and at least partially overlaps with the uplink resource or the downlink resource of the first TTI and the resource of the second TTI in the frequency domain.

7. The method of claim 1, further comprising:
    receiving the configuration message indicating the second TTI is a downlink TTI; and
    identifying, based at least on the configuration message, that the resource of the second TTI is a downlink resource, wherein the time gap is identified between the downlink resource of the second TTI and the uplink resource of the first TTI.

8. The method of claim 7, wherein receiving the configuration message comprises:
    receiving the configuration message that indicates a time gap configuration for the time gap, wherein the time gap is identified based at least in part on the time gap configuration.

9. The method of claim 8, wherein the first TTI follows the second TTI.

10. The method of claim 1, further comprising:
    identifying that the resource of the second TTI is an uplink resource, wherein the time gap is identified between the uplink resource of the second TTI and the downlink resource of the first TTI.

11. The method of claim 10, wherein receiving the configuration message comprises:
    receiving the configuration message that indicates the second TTI is an uplink TTI or a TTI comprising the uplink resource and a downlink resource separated in a time domain.

12. The method of claim 10, wherein receiving the configuration message comprises:
    receiving the configuration message that indicates a time gap configuration for the time gap, wherein the time gap is identified based at least in part on the time gap configuration; and
    determining, based at least in part on the configuration message, the second TTI follows the first TTI.

13. The method of claim 1, further comprising:
    transmitting, to the base station, an indication of a UE capability of the UE, wherein the time gap is identified based at least in part on the indication of the UE capability.

14. The method of claim 13, wherein receiving the configuration message comprises:
    receiving the configuration message that indicates a time gap configuration for the time gap based at least in part on the UE capability.

15. A method for wireless communications at a base station, comprising:

transmitting, to a user equipment (UE), a configuration message indicating a transmission time interval (TTI) format for each TTI of a plurality of TTIs that includes a first TTI having a TTI format an uplink resource and a downlink resource separated in a frequency domain;

identifying a time gap between the uplink resource or the downlink resource of the first TTI and a resource of a second TTI of the plurality of TTIs that is configured for transmission in a direction opposite to the uplink resource or the downlink resource, the second TTI being adjacent in time to the first TTI;

scheduling communications with the UE in the first TTI and the second TTI based at least in part on the TTI format of the first TTI, and the time gap; and communicating with the UE during the first TTI and the second TTI in accordance with the scheduling.

16. The method of claim 15, wherein identifying the time gap comprises:
identifying the time gap based at least in part on the TTI format of the first TTI and the TTI format of the second TTI.

17. The method of claim 15, wherein identifying the time gap comprises:
identifying the time gap based at least in part on a time gap configuration indicated in the configuration message.

18. The method of claim 15, wherein scheduling the communications comprises:
transmitting, to the UE, a scheduling message that schedules the communications in the uplink resource or the downlink resource of the first TTI and the resource of the second TTI, wherein the time gap is identified based at least in part on the uplink resource or the downlink resource of the first TTI at least partially overlapping in the frequency domain with the resource of the second TTI.

19. The method of claim 15, wherein identifying the time gap comprises:
identifying that the time gap is located in a time domain resource of the first TTI and at least partially overlaps with the uplink resource or the downlink resource of the first TTI and the resource of the second TTI in the frequency domain.

20. The method of claim 15, wherein identifying the time gap comprises:
identifying that the time gap is located in a time domain resource of the second TTI and at least partially overlaps with the uplink resource or the downlink resource of the first TTI and the resource of the second TTI in the frequency domain.

21. The method of claim 15, further comprising:
identifying that the resource of the second TTI is a downlink resource, wherein the time gap is identified between the downlink resource of the second TTI and the uplink resource of the first TTI; and
transmitting the configuration message that indicates the second TTI is a downlink TTI.

22. The method of claim 21, wherein transmitting the configuration message comprises:
transmitting the configuration message that indicates a time gap configuration for the time gap, wherein the time gap is identified based at least in part on the time gap configuration.

23. The method of claim 22, wherein the first TTI follows the second TTI.

24. The method of claim 15, further comprising:
identifying that the resource of the second TTI is an uplink resource, wherein the time gap is identified between the uplink resource of the second TTI and the downlink resource of the first TTI.

25. The method of claim 24, wherein transmitting the configuration message comprises:
transmitting the configuration message that indicates the second TTI is an uplink TTI or a TTI comprising the uplink resource and a downlink resource separated in a time domain.

26. The method of claim 24, wherein transmitting the configuration message comprises:
transmitting the configuration message that indicates a time gap configuration for the time gap, wherein the time gap is identified based at least in part on the time gap configuration, and indicates the second TTI follows the first TTI.

27. The method of claim 15, further comprising:
receiving, from the UE, an indication of a UE capability of the UE, wherein the time gap is identified based at least in part on the indication of the UE capability.

28. The method of claim 27, further comprising:
determining a time gap configuration for the time gap based at least in part on the UE capability, wherein the configuration message indicates the time gap configuration for the time gap.

29. An apparatus for wireless communications at a user equipment (UE), comprising:
a processor,
memory coupled with the processor; and
instructions stored in the memory and executable by the processor to cause the apparatus to:
receive, from a base station, a configuration message indicating a transmission time interval (TTI) format for each TTI of a plurality of TTIs that includes a first TTI having a TTI format specifying an uplink resource and a downlink resource separated in a frequency domain;
identify a time gap between the uplink resource or the downlink resource of the first TTI and a resource of a second TTI of the plurality of TTIs that is configured for transmission in a direction opposite to the uplink resource or the downlink resource, the second TTI being adjacent in time to the first TTI;
schedule communications with the base station in the first TTI and the second TTI based at least in part on the TTI format of the first TTI and the time gap; and
communicate with the base station during the first TTI and the second TTI in accordance with the scheduling.

30. An apparatus for wireless communications at a base station, comprising:
a processor,
memory coupled with the processor; and
instructions stored in the memory and executable by the processor to cause the apparatus to:
transmit, to a user equipment (UE), a configuration message indicating a transmission time interval (TTI) format for each TTI of a plurality of TTIs that includes a first TTI having a TTI format an uplink resource and a downlink resource separated in a frequency domain;
identify a time gap between the uplink resource or the downlink resource of the first TTI and a resource of a second TTI of the plurality of TTIs that is configured for transmission in a direction opposite to the uplink resource or the downlink resource, the second TTI being adjacent in time to the first TTI;
schedule communications with the UE in the first TTI and the second TTI based at least in part on the TTI format of the first TTI, and the time gap; and
communicate with the UE during the first TTI and the second TTI in accordance with the scheduling.

* * * * *